United States Patent [19]

Youuessian et al.

[11] Patent Number: 5,894,007
[45] Date of Patent: Apr. 13, 1999

[54] DIFFERENTIAL PRESSURE FORMED LUGGAGE WITH MOLDED INTEGRATED FRAME

[75] Inventors: Elliott Younessian, Westminster; Joseph Kapushion, Thornton; Robert Bromley, Broomfield, all of Colo.

[73] Assignee: Samsonite Corporation, Denver, Colo.

[21] Appl. No.: 08/818,023

[22] Filed: Mar. 14, 1997

Related U.S. Application Data

[63] Continuation of application No. 08/481,962, Jun. 7, 1995, abandoned.

[51] Int. Cl.$^6$ .................................................. B29C 51/10
[52] U.S. Cl. .................... 264/522; 264/550; 425/384; 425/387.1; 425/388
[58] Field of Search .............................. 264/522, 544, 264/549, 550, 553, 554, 318, 291, 292; 425/387.1, 388, 384; 190/121, 122

[56] References Cited

U.S. PATENT DOCUMENTS

| | | |
|---|---|---|
| 1,319,161 | 10/1919 | Miller . |
| 1,505,421 | 8/1924 | Petrie et al. . |
| 1,703,132 | 2/1929 | Acheson . |
| 1,866,483 | 7/1932 | Otten . |
| 2,454,366 | 11/1948 | Worley . |
| 2,822,900 | 2/1958 | Kivett . |
| 2,878,907 | 3/1959 | Kivett . |
| 2,949,987 | 8/1960 | Greenberg . |
| 3,058,153 | 10/1962 | Busch . |
| 3,290,418 | 12/1966 | Best .................................. 425/292 |
| 3,292,252 | 12/1966 | Reading . |
| 3,292,749 | 12/1966 | Reading . |
| 3,391,765 | 7/1968 | Baker . |
| 3,513,951 | 5/1970 | Leong et al. . |
| 3,577,593 | 5/1971 | Jackson ............................... 425/388 |
| 3,640,668 | 2/1972 | Brown, Jr. et al. . |
| 3,669,228 | 6/1972 | Kotkins ................................. 190/41 |
| 3,901,640 | 8/1975 | Tigner et al. ........................ 425/388 |
| 3,962,010 | 6/1976 | Riou et al. ............................ 156/93 |
| 4,095,719 | 6/1978 | Wolf ..................................... 220/4 |
| 4,284,202 | 8/1981 | Barstow, Jr. ........................... 220/4 |
| 4,288,401 | 9/1981 | Keith et al. .......................... 264/550 |
| 4,363,617 | 12/1982 | Hirsekorn ........................... 425/388 |
| 4,480,979 | 11/1984 | Keith et al. .......................... 264/550 |
| 4,495,135 | 1/1985 | White ................................. 425/388 |
| 4,595,554 | 6/1986 | Bullock et al. ..................... 264/522 |
| 4,822,553 | 4/1989 | Marshall ............................ 264/549 |
| 4,941,814 | 7/1990 | Araki et al. ......................... 425/388 |
| 4,993,585 | 2/1991 | McMahon ........................... 220/643 |
| 5,044,476 | 9/1991 | Seynhaeve ........................... 190/18 |
| 5,128,090 | 7/1992 | Fujii et al. .......................... 425/388 |

FOREIGN PATENT DOCUMENTS

| | | |
|---|---|---|
| 57-178812 | 11/1982 | Japan .................................. 264/318 |
| 1068453 | 5/1967 | United Kingdom . |
| 1246086 | 9/1971 | United Kingdom . |
| 1256695 | 12/1971 | United Kingdom . |
| 1376198 | 12/1974 | United Kingdom . |
| 1403092 | 8/1975 | United Kingdom . |
| 2079255 | 1/1982 | United Kingdom . |

*Primary Examiner*—Catherine Timm
*Attorney, Agent, or Firm*—Gregory W. O'Connor; Rod D. Baker

[57] ABSTRACT

The invention relates to hard sided luggage shells and other containers manufactured using vacuum forming or pressure forming of thermoplastics. A process for making shells and containers with integrally molded frames is disclosed, and products made by the method. A method of manufacturing differential pressure formed containers with framed openings, but without the need to attach a separate frame element to the molded shell. A process also is disclosed for reducing the undesirable stretching of shell material that occurs during differential pressure forming, particularly the thinning of corner portions of the shell or container. The process of the invention more efficiently utilizes the thermoplastic material by moving material from otherwise offal portions into the molded product. An improved method for severing the offal material from the final product is disclosed.

19 Claims, 11 Drawing Sheets

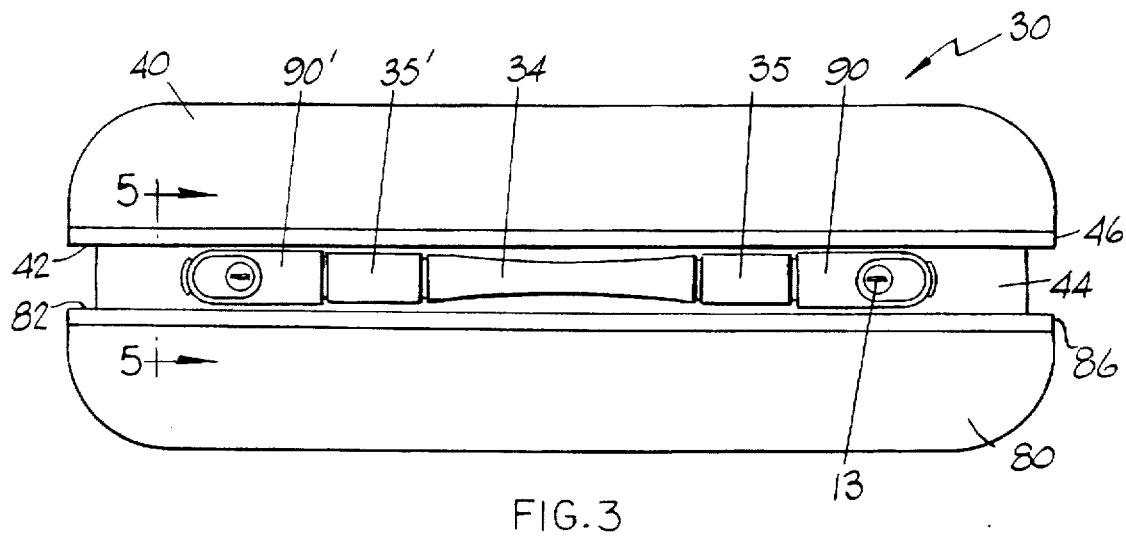
FIG. 3
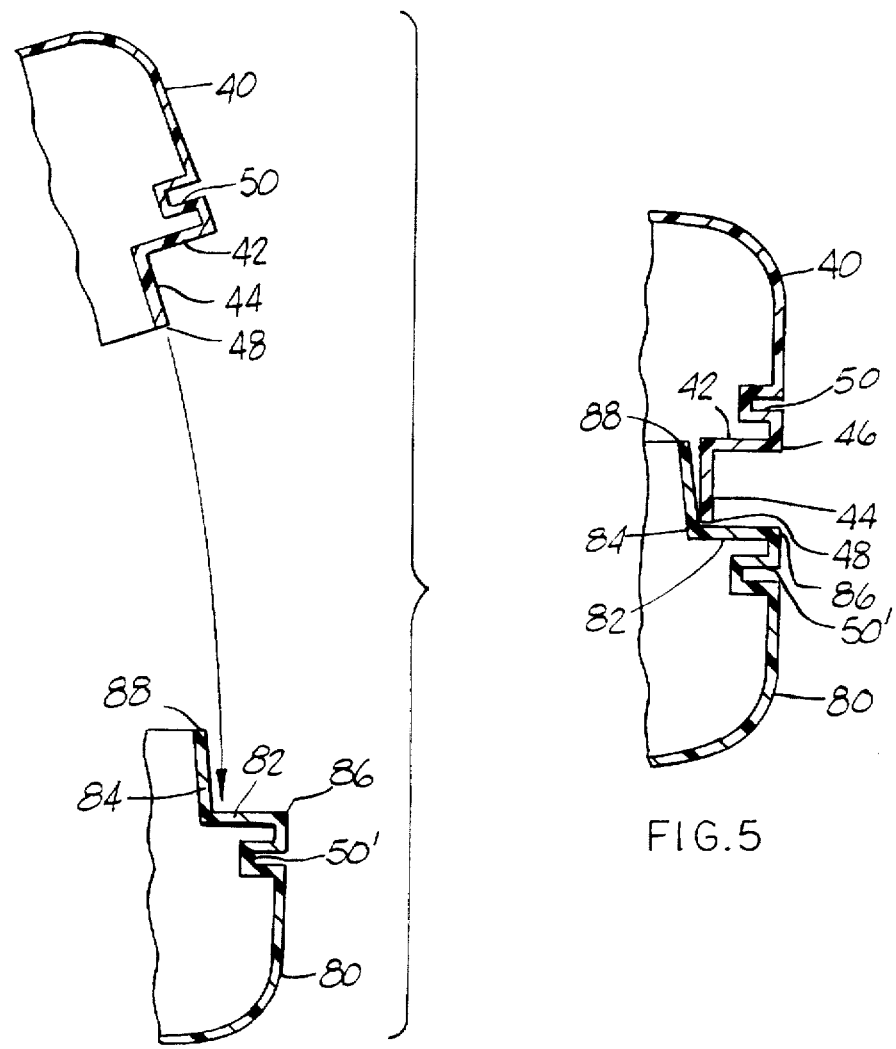
FIG. 4
FIG. 5

DIFFERENTIAL PRESSURE FORMED LUGGAGE WITH MOLDED INTEGRATED FRAME

This application is a continuation of Ser. No. 08/481,962 filed on Jun. 7, 1995 now abandoned.

BACKGROUND OF THE INVENTION

1. Field of the Invention

The invention relates generally to vacuum formed and pressure formed products and processes, particularly hard sided luggage.

2. Background Art

Hard sided luggage usually consists of two shells, commonly called a lid shell and a base shell. Each shell typically is made from a sheet of thermoplastic material that has been molded in the shape of a container. The shell frequently is shaped as a rectangular box with rounded corners whose open side is defined by a peripheral edge. The peripheral edges of the two shells substantially correspond to one another, so that the lid shell may be placed, concave side down, upon the base shell with its concave side up, so that the respective edges are aligned and/or in contact. So arranged, the shells may then be connected by hinges and releasable latches, as known in the art, to define a container with an accessible interior space.

A principal objective in hard sided luggage making is to provide a case that is at once both lightweight and strong. Besides being puncture-proof and unbreakable, a hard sided case of ideal strength also resists gross deformation of its overall shape due to external torsional or flexural forces. While some minor flexibility is desirable in a hard sided case, an advantage of hard sided luggage should be its rigidity—the ability to withstand forces without undue amounts of twisting or bending. Twisting of any type of luggage can jeopardize the luggage contents, and may also damage hinges and promote latch failure.

Shells incorporated in hard sided luggage are normally molded using one of two manufacturing processes. Injection molding involves the injection, under pressure, of molten thermoplastic resin, typically polypropylene, into massive steel molds to form substantially complete shells including integral frame and attachment points for wheels, handles, etc. The nature of injection molding processes and machinery limit somewhat the ultimate configuration of the molded item. Injection molding also requires the use of very high pressure systems, which can be expensive to acquire and maintain, and which may limit product variety and rapid product modification.

The other main process, commonly called "vacuum forming," involves forcing a heated sheet of thermoplastic against a male or female mold. The driving force is provided by a pressure differential, so that a difference in air pressure on opposite sides of the sheet causes the sheet to move against the mold. Strictly speaking, "vacuum forming" refers to the creation of a "negative," or reduced pressure in the volume between the sheet and the mold, thereby pulling or "sucking" the sheet up to the mold. Alternatively, "pressure molding" involves the creation of a volume of "positive," or elevated pressure on the side of the sheet opposite from the mold, thereby blowing or pushing the sheet to the mold. Moreover, pressure molding and vacuum molding can and frequently are simultaneously performed within a single apparatus, and such combined processes sometimes are generically referred to as "vacuum molding." Unless the specific terms "vacuum forming" or "pressure forming" are used, this disclosure shall use the generic term "pressure differential forming," meaning vacuum forming alone, pressure forming alone, or a combination of the two processes.

In differential pressure forming, after the pliable heated sheet has conformed to the shape of the mold surface, it is removed from the mold. The three dimensional shaped shells are then trimmed to proper size and to eliminate edge sections (sometimes called offal or selvage portions) needed for the process but not forming a part of the final product. Conventionally, in order for the resulting formed case to have adequate rigidity, the formed shell is riveted or stapled to a separate frame component—commonly a metal frame extruded from aluminum or magnesium alloys. Hinges are attached to the frames, and other hardware and lining elements are then attached to form the completed case.

A disadvantage of the standard differential pressure forming processes for making luggage is the need for the separate frame component to be attached to the shell. A typical differential pressure formed shell, alone, is relatively crush proof and puncture proof, has flexible strength yielding to stress, and is subject to both plastic and elastic deformation when subjected to any considerable loading. The frame, on the other hand, is light and strong, but comparatively inflexible. The stiffness of the frame and the flexibility of the shell do not compliment each other, especially at the local stress points where the shell and the frame are riveted or stapled together. At these points of elevated stress, rivets or staples are prone to pull through or tear the thermoplastic shell. Also, the magnesium and aluminum frames add expense to the manufacture of the case; the frame itself usually requires a number of finishing steps because it is a principal aesthetic feature of the completed article of luggage. Also, the frame is typically used to hide the raw edge of the trimmed formed shell.

Another problem frequently encountered in conventional vacuum-forming container manufacturing processes is undesirable thinning in the walls of the finished product, particularly near corners and edges. This poses serious disadvantages to container strength, since corners and edges tend to be the portions of the container subject to elevated impact and bending stresses.

Still another problem encountered in the present art is the limitations that are imposed upon the shape of the final product by the need to remove the finished product from the mold. The finished product is simply pulled straightaway from the mold once the thermoplastic has cooled. In order for this separation to be accomplished without cutting the molded product, the mold must be shaped to provide that no part of the molded product interlocks with the mold itself; if a standard vacuum mold surface has substantial projections or depressions into which product material is forced, a the product will interlock with the mold to prevent the product from being pulled away from the mold in the direction of attempted separation. Unfortunately in the present art, this limitation on the shape of the mold has hindered container design, including the design of integrally framed luggage shells.

Luggage shells have also been manufactured using blow molding and rotational molding processes. Blow molding and rotational molding have a variety of limitations in luggage applications. For example, blow molding and rotational molding processes have poor thickness control, resulting in thin spots in walls. These prior art processes are also limited as to the shapes and compositions of the products produced, and do not permit ready lining or finishing of interior surfaces.

Thus a need remains for a luggage product manufactured using the comparatively simple and inexpensive pressure differential molding process, but which overcomes the disadvantages of present products and improves upon the manufacturing process. Against this background, the present invention was developed.

SUMMARY OF THE INVENTION

The invention relates generally to differential pressure formed products and processes, particularly hard sided luggage. The invention is a container, such as a luggage case shell, and making the container using pressure differential pressure forming processes, which dispenses with the need to attach a separate frame element to the formed product. The making of the product includes a process for molding a shell from a sheet of plastic material, where the shell has a bottom and sides extending from the bottom to a peripheral edge, and the intersections of the sides with each other and with the bottom define the shell corners. The process includes providing a sheet of thermoplastic material with a central portion, a marginal portion, and a selvage portion; providing a mold with a mold surface; positioning a portion of the sheet in the mold means in a confronting relation to the mold surface; conforming the central portion of the sheet to the mold surface; and shaping the marginal portion of the sheet to fashion a frame integrally formed with the central portion of the sheet, with the frame extending substantially continuously along at least a portion of the peripheral edge. The inventive process may also include the steps of heating the sheet of plastic material; partially surrounding a form space with a mold surface; placing at least one movable side draw form in an extended position in the form space; forcing the central portion of the heated sheet against the mold surface; forcing the marginal portion of heated sheet against the side draw form while the side draw form is in the extended position to shape the marginal portion of the sheet to increase the cross sectional moment of inertia of the shell at the peripheral edge; and then retracting the side draw form to a retracted position at least partially exterior to the form space while the heated sheet is against the mold. A product of improved quality is produced by stretching certain parts of the sheet prior to supplying the pressure differential and by retarding the stretching, through cooling processes, of other sections of the sheet which form the shell corners. Also, the process for making the inventive product includes a mode of increasing the volume of thermoplastic material in the portion of the sheet forced against the mold through shifting material from the selvage portion of the sheet toward a location nearer the mold, by providing a clamp remote from the mold; holding the selvage portion of the sheet in the clamp; and permitting the selvage portion of the sheet to stretch away from the clamp and toward a location in confronting relation to the mold surface.

A primary object of the invention is to provide a mode of differential pressure forming a container with an integrally formed frame.

Another object of the invention is to provide a differential pressure formed container product without a separately attached frame element.

A primary advantage of the invention is that a container product is produced by methods providing improved container strength without a net increase in materials requirements.

Other objects, advantages and novel features, and further scope of application of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention, and together with the written description serve to explain the principles of the invention. The drawings are only for the purpose of illustrating a preferred embodiment of the invention and are not to be construed as limiting the invention. In the drawings:

FIG. 3 is a front view of the luggage case apparatus of the invention, showing the case in a closed position;

FIG. 4 is a partial sectional side view of the luggage case apparatus of the invention in a partially open position, the section taken substantially along section line 4—4 in FIG. 2;

FIG. 5 is a partial sectional side view of the FIG. 3 embodiment, the section taken substantially along section line 5—5 in FIG. 3;

DESCRIPTION OF THE PREFERRED EMBODIMENT

(BEST MODE FOR PRACTICING THE INVENTION)

The improvements of the present invention pertain to the manufacture of hard sided luggage, although it will be understood that the principles of the invention certainly may be used in the manufacture of containers generally. The advantages of the invention may be realized whenever it is desired to provide an integrally formed frame about a thin thermoplastic hollow shell with an opening into the shell bound by the integrally formed frame.

Figure 1:
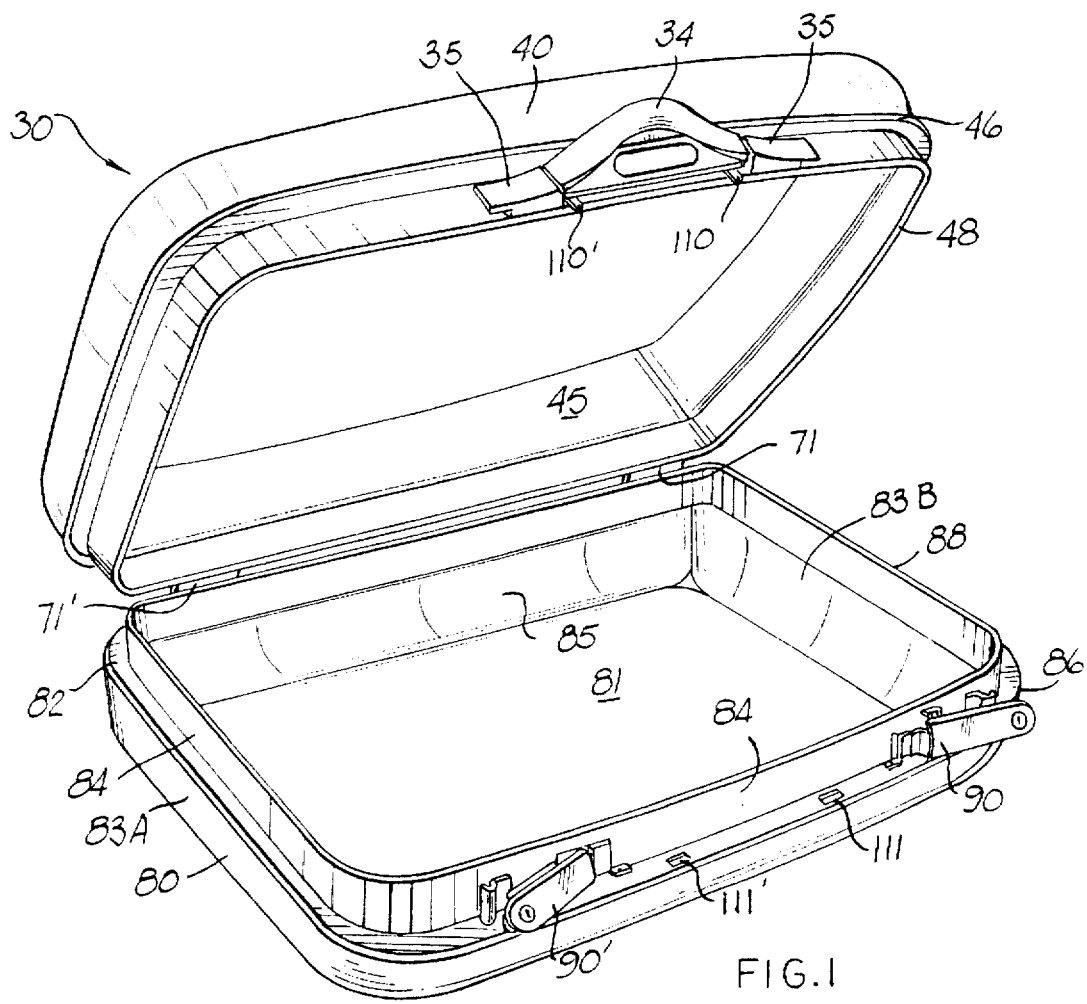
FIG. 1 is a perspective view of the preferred embodiment of the luggage case apparatus of the invention, with the case partially open.

Attention is invited to FIG. 1, which shows a perspective view of a luggage case 30 manufactured according to the invention. The item shown is a pullman style case, although the invention applies as well to popular "upright" luggage styles. Moreover, while the case 30 depicted in FIG. 1 has no wheels or wheel handle, it will be readily understood that alternative embodiments of the luggage apparatus of the invention may incorporate wheels and pull handles known in the art for allowing luggage to be wheeled, rather than carried.

Figure 2:
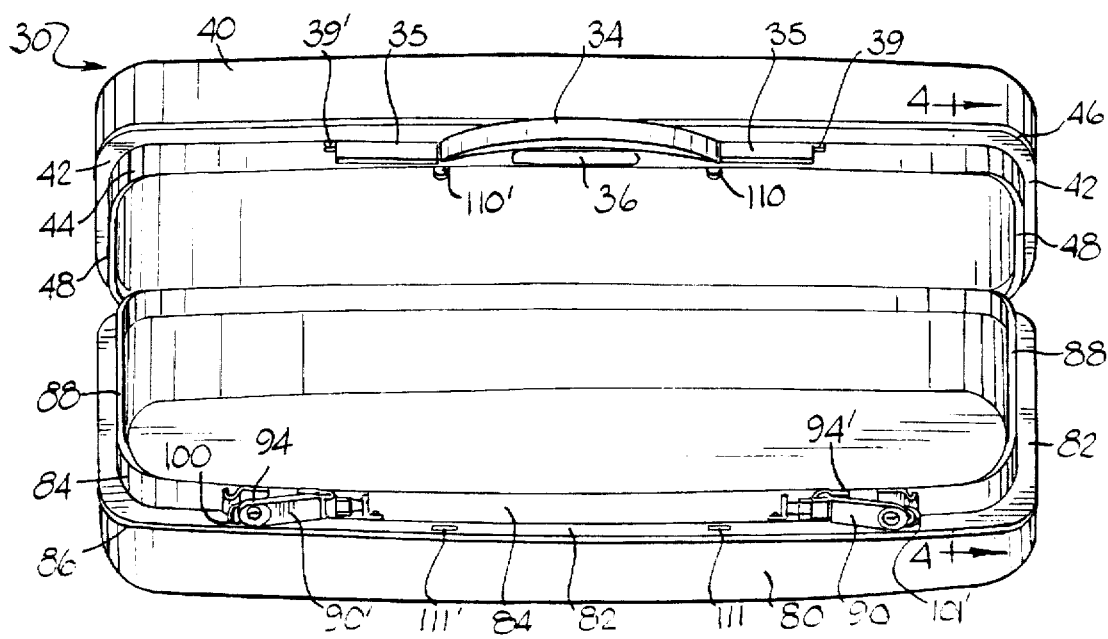
FIG. 2 is a front view of the FIG. 1 embodiment.

Reference is made to FIGS. 1–3. The inventive case 30 includes a lid shell 40 and a base shell 80. The inventive process may be employed to manufacture both the base shell 80 and the lid shell 40, and in the preferred embodiment the shells 40,80 are very similar in their configuration and shape. Optional variations of the invention may include embodiments where only one of the shells of the case 30 is manufactured according to the invention; indeed, one of the shells, perhaps the lid shell 40, may be made of stitched cloth panels, generally termed "soft side" construction.

In the preferred embodiment, each shell 40,80 is molded from a single sheet of thermoplastic material. The invention is particularly well-suited to the molding of sheets of acrylonitrile-butadiene-styrene (ABS). The invention also can be practiced using a vacuum-formable (e.g. a low melt index) polypropylene. Thus, the invention is applicable to forming polypropylene, and can make an inventive product that has the appearance of having been injection molded, even though it was differential pressure formed.

The stock sheet typically is a rectangular and planar sheet of material, perhaps extruded, with marginal portions surrounding a central portion. In the description to follow, the sheet will be described with respect to a central portion, a marginal portion, and a selvage portion. The selvage portion is a comparatively small proportion of the overall sheet, and is comprised of the border of the sheet adjacent to its original edges. The selvage portion is needed to secure the sheet within the vacuum-forming machinery; it does not become part of the finished product but is trimmed away during or immediately after the molding process. The central portion of the sheet is the bulk or majority portion of the sheet that is molded to form the main part of the shell. The marginal portion, whose size in proportion to the central portion may vary substantially from product to product, is the portion of the sheet defining the perimeter of the central portion; its outer limit is the intersection with the selvage portion. The marginal portion becomes an integral part of the finished product, and effectively comprises the edge of the finished shell once the selvage is trimmed away. The sheet is heated to render it flaccid and pliable, and while in a flaccid state it is molded to assume a shape similar to base shell 80 illustrated in FIG. 1.

Except for where otherwise noted, description of the base shell 80 serves to describe the lid shell 40 as well. In the preferred embodiment, each formed shell 40,80 obtains a generally concave shape with a bottom portion 81 and integral side portions 83a,83b which extend away from bottom portion 81. The side portions 83a,83b and bottom portion 81 thus enclose on five sides the interior space of the shell 80 in which items may be stored. The apparatus of the invention is not limited to any particular overall shape, however, and may include cylindrical containers. The molding and shape of certain facets of the side portions 83a,83b are an aspect of the invention, and will be further explained.

Side portions 83a,83b extend away from bottom portion 81 to a rim 86. The lid shell 40 has a lid shell rim 46, and base shell 80 has a base shell rim 86. Rims 46,86 preferably extend about the entire perimeter defined by the side portions of the respective shells 40, 80. Preferably, but not necessarily, when the case 30 is completely closed and placed upon a horizontal supporting surface, the rim 86 occurs where a plane tangent to the plenum of the shell 80 is substantially perpendicular to the supporting surface, as illustrated in FIG. 3.

Both shells 40,80 are shaped to provide an integrally molded frame about their respective rims 46,86. This frame presents tremendous advantages, in that it is integrally molded with the shell, e.g., being formed from the same sheet of thermoplastic as the shell. The formation of an integral frame eliminates the need to staple or otherwise attach a separate frame, e.g. an extruded magnesium hoop, to the shell. This reduces tremendously the time and cost of manufacture, and obviates the problems associated with coupling a separate rigid frame to a flexible shell.

Figure 7:
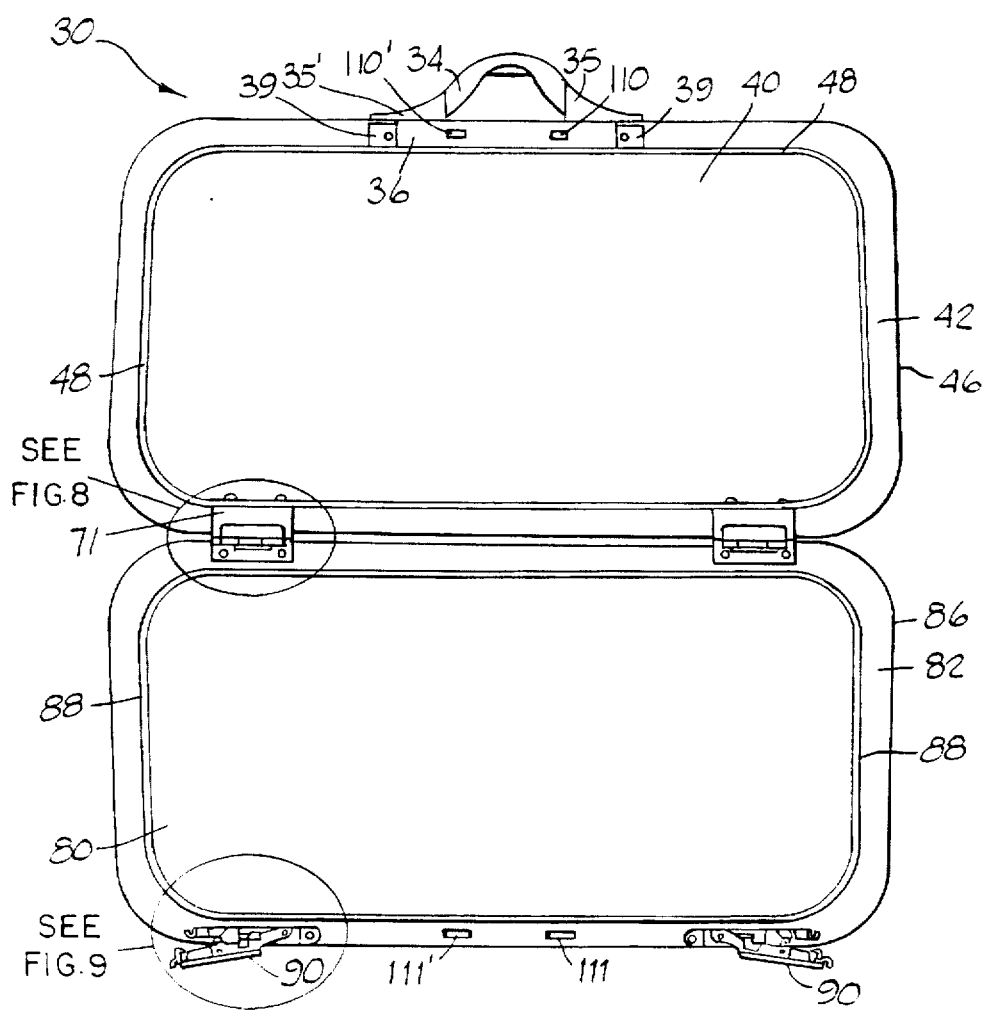
FIG. 7 is a top view of the preferred embodiment of the luggage case apparatus of the invention, showing the case completely open.

Combined reference is made to FIGS. 1 and 2. General description of the shell 80 continues to describe corresponding and analogous components of the lid shell 40 as well. In the preferred embodiment, the integrally molded frame includes a wall member 82 depending from the shell 80 in the vicinity of the rim 86, and a flange 84 extending from the wall member 82. Each of shells 40,80 has a wall member 42,82 extending inwardly, (that is, into and toward the interior space) from the respective rims 46,86. Lid shell 40 has lid shell wall member 42 and base shell 80 has base shell wall member 82. As shown in FIGS. 1, 2 and 7, each wall member 42,82, like the rims 46,86, preferably (but not necessarily) runs about the full perimeter of the case 30. In the preferred embodiment, wall members 42,82 depend perpendicularly from the rims 46,86 of the respective shells 40,80, i.e., wall member 82 is substantially parallel to a horizontal supporting surface upon which the case 30 might be placed (FIG. 3). Thus, the angle as seen in cross section (in FIG. 4, for example) that the wall member 82 makes relative to the immediate adjacent side portions 83a or 83b of shell 80 preferably is about ninety degrees. In alternative embodiments, however, the angle between a shell side portion and its depending wall member may be oblique at any suitable angle.

Projecting from the respective wall members 42,82 are base flange 84 and lid flange 44. Like the wall members 42,82, flanges 44,84 are integrally molded from the same sheet of thermoplastic as their corresponding shells 40,80. Shell 80, wall member 82, and flange 84 thus are not separable components, but rather are extensions of one another all molded from the single original thermoplastic sheet. One of the flanges 44,84, preferably the lid flange 44, extends perpendicularly from its respective wall member 42. As illustrated in FIGS. 1 and 2, flanges 44,84 extend outward from wall members 42,82, that is, they project away from the interior space.

The free edges of the flanges 44,84 define the respective peripheral edges 48,88 of shells 40,80. Peripheral edges 48,88 run about the perimeter of the open side of each shell 40,80, and thus circumscribe the opening and establish its dimensions.

As shown in FIGS. 1–3 and 7, base shell 80 and lid shell 40 are configured to be used in conjunction, the lid shell 40 aligned atop the base shell 80. When the case 30 is closed (FIG. 3) the peripheral edges 48,88 register in close proximity. The shells 40,80 are pivotally connected together along corresponding lengths of their respective back sides 45,85 (FIG. 1). The pivotable connection preferably is by a pair or more of hinges 71,71', or a single length of piano hinge, or the like. Accordingly, the lid shell 40 may by swung upward from base shell 80 to expose the interior storage space of the case, or may be lowered to completely enclose and define the interior space.

Alternative embodiments of the case 30 may be hingeless. For example, a case or box container may be composed of a lid that slides straight down onto the base, in a manner common to hat boxes and shoeboxes. In such an embodiment, the flanges 44 and 84 still slide past one another in an overlapping fashion; the lid shell 40 and the base shell 80 simply are completely separable with no hinged connection. Claw bolt or other types of latches on one of the shells engage a ridge or ridges around the other shell to secure the shells together.

FIGS. 4 and 5 show enlarged cross sections of portions of the inventive luggage case 30. These figures depict in further detail the specific configuration of the integral frame feature of the apparatus of the invention. FIG. 4 is a sectional view of the shells 40,80 taken substantially along line 4—4 in FIG. 2, as the shells 40,80 are oriented when case 30 is partially ajar. FIG. 5 shows, in cross section taken substantially along line 5—5 in FIG. 3, the relative position of the elements of the integral shell frames when the case 30 is closed. Shells 40,80 may be molded in a gentle curved cross section extending to their respective rims 46,86. At each rim 46,86, the shells 40,80 are bent inward, according to the process hereinafter described, to create wall members 42,82. In the preferred embodiment, each of wall members 42,82 projects into the interior space contained by the case 30, substantially perpendicular to the imaginary plane that is tangent to the curve of the respective shell 40,80 at its rim 46 or 86. The inward distance that wall members 42,82 project is not absolutely critical, but it must be substantial (e.g. about 3.0 cm on a standard sized pullman case) in order to provide the desired cross sectional moment at the perimeter of the shells, and thus the appropriate rigidity to the shells 40,80.

Depending from the lid shell wall member 42 and from the base shell wall member 82 are lid flange 44 and base flange 84, respectively. The shell flanges 44,84 are fashioned substantially concurrently with the formation of the wall members 42,82, using the same inventive process. Like the wall members 42,82, the shell flanges 44,84 are molded from the material of the original sheet of thermoplastic, and thus are integral extensions of their corresponding wall members 42,82. In the preferred embodiment lid flange 44 projects perpendicularly from wall member 42; the lid flange 44 member extends downward toward the base shell 80. Base flange 84 extends upward toward the lid shell 40, as shown in FIG. 4. The base flange 84, however, preferably is canted or obliquely tilted with respect to base wall member 82. It has been determined that providing base flange 84 with a slight inward (toward the enclosed space) tilt encourages the lid flange 44 to smoothly and automatically slide past and around the base flange 84, promoting an automatic alignment and registration of the shells 40,80 during closure of the case 30.

The dimensions and general cross-sectional configuration of the base flange 84, base shell wall member 82, the lid flange 44 and the lid shell wall member 42, preferably are uniform throughout their occurrence around the perimeters of the shells 40,80. It is noted, however, that effective alternative embodiments of the invention may vary the dimensions (or configuration) of the wall members 42,82 and flanges 44,84, as a function of their specific location upon the perimeter of the respective shell 40 or 80. Moreover, alternative embodiments of the invention may involve interruptions in the flanges 44,84 and/or the wall members 42,82 to accommodate other structural elements, reduce weight, or to address other concerns. Thus, while in the preferred embodiment the frame consisting of the wall members 42,82 and shell flanges 44,84 extends completely around the opening of each shell 40,80, alternative embodiments may provide the frame element only to certain portions of the shell perimeter.

Molding a thermoplastic sheet to fashion and incorporate the wall members 42,82 and flanges 44,84 into the shells 40,80 thus presents the advantage of creating an integrated frame, dispensing with the need to attach a separate frame component to the shell. Each shell 40,80 is stiffened and stabilized by the rigidity provided by its associated flange 44 or 84 and especially by its respective wall member 42 or 82. This increased rigidity is observed in any single shell 80 considered in isolation (e.g. when the case 30 is open, or in those embodiments of the invention which incorporate only one hard shell). The additional stiffness results from the moment of inertia of the cross section of the shell 80, flange 84, and wall member 82 in the immediate vicinity of rim 86. The moment of inertia of the flange 84, wall member 82 and shell 80, with respect to any imaginary axis within the shell 80 (and, say, parallel to the rim 86), is increased due to the relative displacement of the shell flange 84 from the shell 80. By offsetting the flanges 44,84 from their respective shells 40,80, and rigidly connecting the shells and flanges with wall members 42,82, the shells' resistance to bending is dramatically improved. The wall member 82 and flange 84 combination effectively serves as an L-beam frame around the opening of the shell 80, fully integrated with the shell 80.

A noteworthy aspect of the preferred embodiment of the apparatus of the invention is the operational relationship of the lid shell wall member 42 and lid flange 44 with the base shell wall member 82 and the base flange 84. The relationship is best understood with reference to FIGS. 2, 4 and 5. FIG. 5 shows, in cross section, the relative positions of the two shells 40,80 and their respective integral frames when the case 30 has been completely closed, as in FIG. 3. These figures illustrate that in the preferred embodiment the lid shell wall member 42, the lid flange 44, the base shell wall member 82, and the base flange 84, are deliberately dimensioned so as to cooperate to provide an improved case. The cooperation of the lid shell frame with the corresponding elements of the base shell 80, provides an improved mode of case closure, as well as to increase the rigidity and security of the closed case.

FIG. 5 shows that when the case 30 is closed, an overlapping relationship is provided between the lid flange 44 and the base flange 84. Lid shell wall 42 extends inward from the lid shell 40 a distance somewhat less than the distance the base shell wall member 82 extends inward. The difference in distances preferably is approximately equal to the combined thicknesses of the two flanges 44,84. Accordingly, the perimeter dimension of the base shell peripheral edge 88 is slightly shorter than that of the lid shell peripheral edge 48. FIGS. 4 and 5 also show that base flange 84 extends in length a distance slightly longer than the distance extended by lid flange 44 (e.g. the difference in distances is approximately equal to the thickness of one of the flanges). These differences in dimensions between the frame components of the lid shell 40 and the corresponding components of the base shell 80 provide for the overlapping relationship depicted in FIG. 5 when the shells 40,80 are brought together to close the case. Lid flange 44 overlaps, and mildly slidably contacts, the base flange 84. Also, when the case 30 is closed the lid shell peripheral edge 48 preferably contacts the base shell wall member 82.

Figure 8:
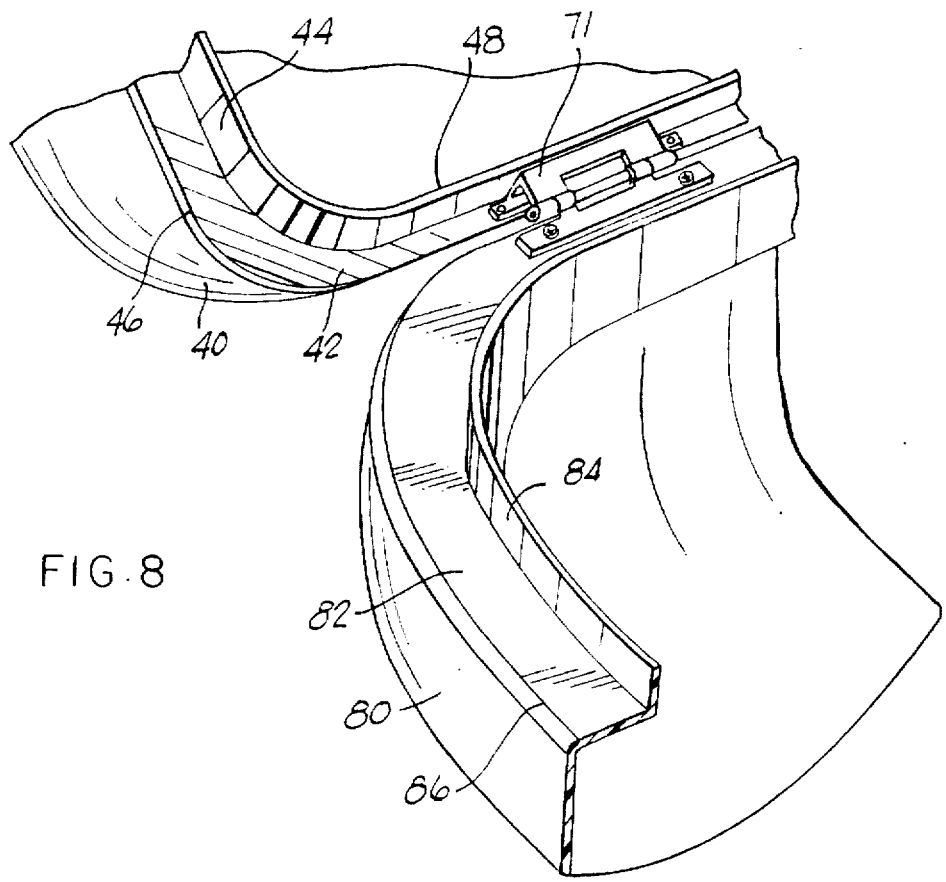
FIG. 8 is a partial enlarged view of the hinge portion of the FIG. 7 embodiment.

An added benefit of the configuration of flanges 44,84 is that they interact during the closure of the case 30 to cause case 30 to close properly. The shells 40,80 are essentially self-aligning during closure, because the peripheral edge 48 of the lid shell 40 is slightly greater in circumference than the peripheral edge of the base shell 80, and because the shells 40,80 are hinged together at at least one point so as to place the lid flange 44 to the outside of the base flange 84 (FIG. 8). The lid flange 44 will always slide to the outside and around the base flange 84, and then register against the base shell wall member 82 as shown in FIG. 5, even if the two shells 40,80 were not properly aligned at the inception of closure.

This arrangement of the flanges 44,84 and wall members 42,82 when the case 30 is completely closed offers advantages of strength. FIG. 5 shows that when the case 30 is closed, the wall members 42,82 preferably are substantially parallel but spaced apart a distance (e.g., approximately 3.0 cm in a typical pullman case). Accordingly, when the case 30 is closed, the wall members 42,82 and flange 44,84 elements of the respective shells 40,80 function cooperatively to form a type of U-beam frame around the perimeter of the case 30; the wall members 42,82 serve as the legs of the U-beam while the flanges 44,84 function as the back of the beam. This cooperative strengthening function is dramatically enhanced when the shells 40,80 are latched together, for example, when a latching mechanism securely links one wall member 42 to the other wall member 82. This cooperation of the flanges 44,84 and the wall members 42,82 of both shells 40,80 to form a sort of U-beam frame around the closed case 30 serves to dramatically increase the case's resistance to bending, warping, or buckling. Thus, while lacking an expensive, separately attached frame, the case 30 nevertheless offers substantially secure storage of contained articles. Externally applied forces are readily transmitted from either shell to the other shell, via the wall members 42,82 and flanges 44,84.

Additionally, the overlapping and engaged flanges 44,84 and wall members 42,82 serve to strengthen the case 30 against carrying loads when the case 30 is filled, closed, and carried by the carry handle 34. In the preferred embodiment, shown in FIGS. 3, 5, 6 and 10, the carry handle 34 of the case 30 is securely attached to the wall member 42 of lid shell 40. Accordingly, the forces from the weight of the loaded case 30 are initially transmitted from the handle 34 to the lid shell 40. But, in the preferred embodiment, these carrying loads, besides being disbursed throughout and borne by the lid shell 40, also are directly transmitted from the carry handle 34 to the lid shell wall member 42, thence to the catches 39,39', thence to the latches 90,90', and thence to the base shell wall member 82 for transmission to the base shell 80 itself. Some loading forces (such the weight of a user sitting on the case while the case is in an upright position, as well as carry forces originating at the handle 34) also are transmitted from the lid flange 44 directly to the base flange 84, and thence to the base shell wall member 82 to be distributed through the base shell 80. The overlapping configuration of the flanges 44,84, the engagement of alignment pins 110,110' into alignment apertures 111,111', and the use of a latch 90 and catch 39 to connect in a bridge-like manner the opposing wall members 42,82, thus effectively transfer throughout the case 30 the load forces imposed upon the case 30 originating at the handle 34 or elsewhere.

FIG. 8 details the pivotable connection of the lid shell 40 to the base shell 80 using one or more hinges 71. The mode of connection shown in FIG. 8 has hinge 71 being secured, with screws, rivets, or the like, to base shell wall member 82 and to lid flange 44. For added strength and durability, the hinge 71 may be adapted to be secured to the lid shell wall member 42. The hinge 71 thus is mounted to the stiffest, strongest, parts of the shells 40,80—the integral frame elements defined by the flanges 44,84 and the wall members 42,82. Hinge 71 is fixedly positioned upon the base shell wall member 82 so as to provide that the lid flange 44 may swing into overlapping position relative to the base flange 84 when the lid shell 40 is closed down onto base shell 80. When the case 30 is completely closed, the hinge 71 is on the outside of the case 30, with the lid flange 44 disposed between the hinge 71 and the base flange 84.

FIGS. 2, 6, 7, and 10 collectively show the preferred attachment of the carry handle 34 to the lid shell 40, and the preferred attachment of at least one latch 90 to the base shell 80. The attachment to the lid shell 40 of the handle assembly consisting of the handle 34, handle bezel 35 and handle base 36, while the latches 90,90' are attached to the base shell 80, is a departure from convention in the art. In the known art, the handle assembly and the latches typically are all mounted on the base shell, often for reasons related to the provision or configuration of the separate metal alloy frame. The apparatus of the invention permits handle 34 to be securely mounted to the lid shell 40, which is an advantage to the user. Intuitively, a handle 34 should be placed upon the lid shell 40, where it can serve as a grip with which to lift the lid shell 40 when opening the case 30.

The latches 90,90' of the preferred embodiment, however, are on the base shell 80. In the preferred embodiment, the latches 90,90' engage with catches 39,39' on lid shell 40 to secure the case 30 in a closed position.

Figure 6:
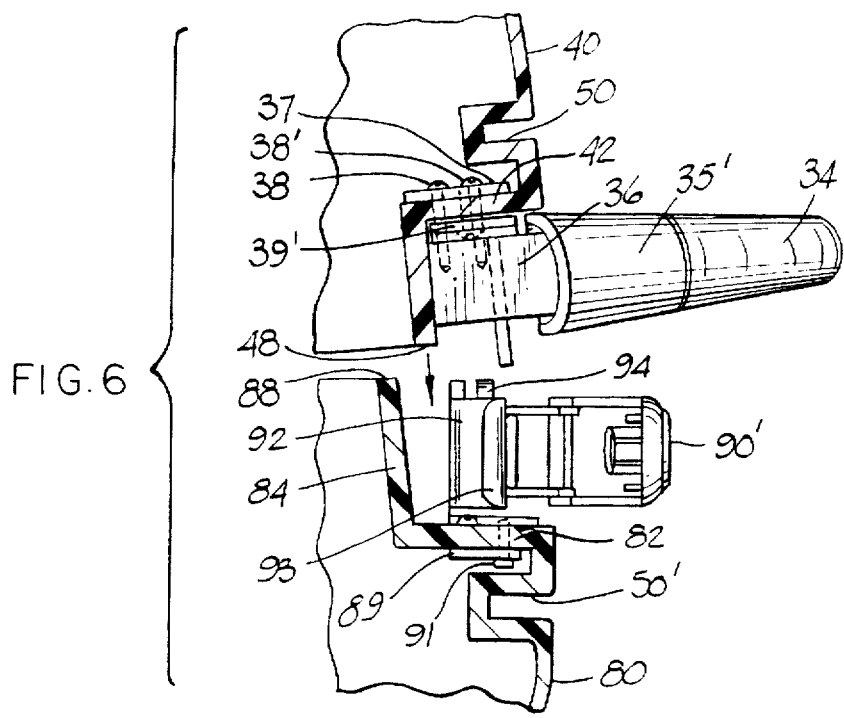
FIG. 6 is a partial enlarged sectional side view of the luggage case apparatus of the invention, showing details of the latch and handle elements.
Figure 10:
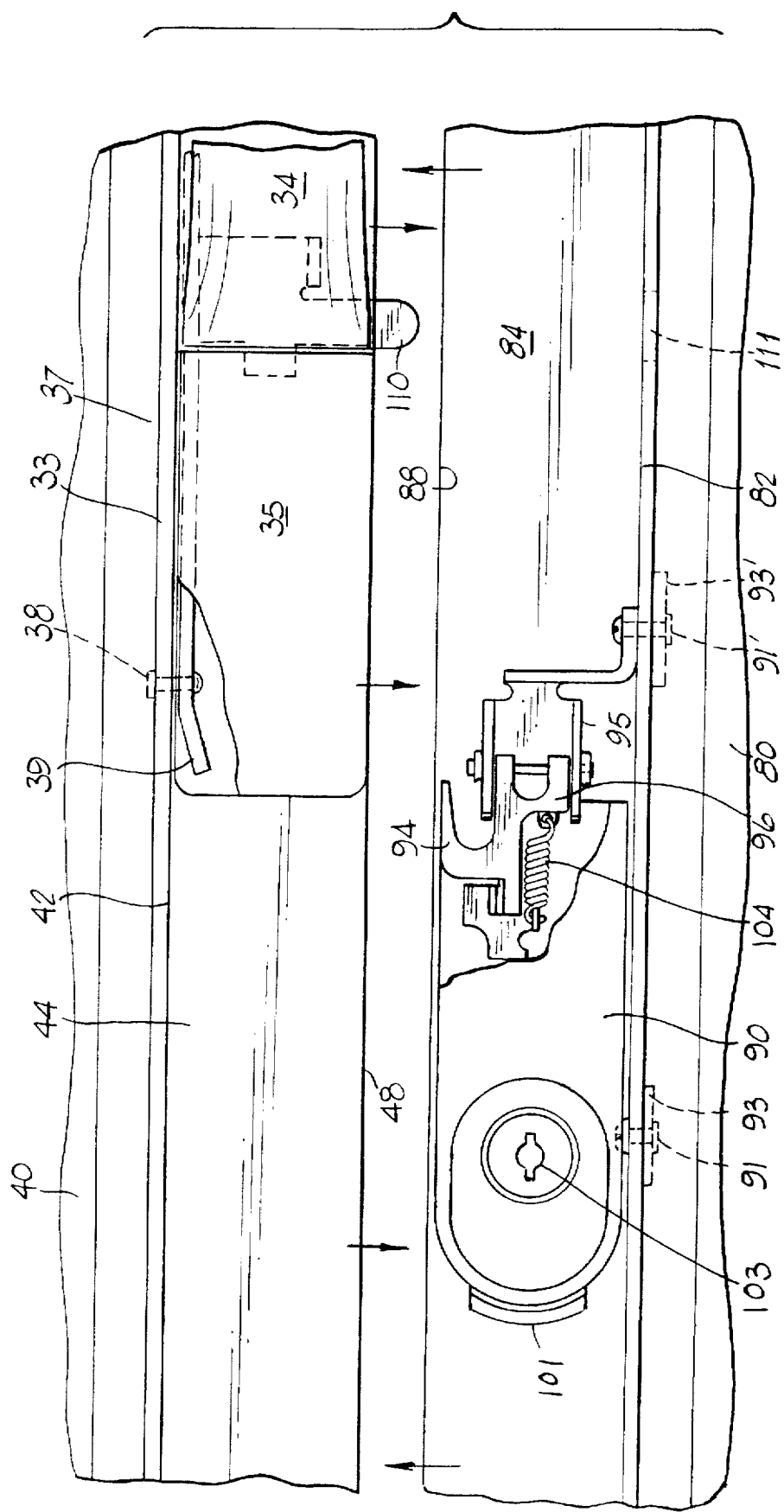
FIG. 10 is a partial enlarged view of the luggage case apparatus of the invention in a slightly opened position, with portions broken away to show details of the latch, handle, and catch elements.

Attention is invited to FIGS. 6 and 10, detailing the attachment of the handle 34 to the lid shell 40. Handle 34 and handle bezels 35,35' are fixedly connected to handle base 36. Handle base 36 preferably is securely mounted, as with rivets 38,38' or the like, upon the outside face the lid shell wall member 42. Preferably, but optionally, a thin, rigid, backing plate 37 (FIG. 6) may be mounted upon the inside surface of the lid shell wall member 42, opposite the handle base 36, to provide reinforcement and a noncompressible surface against which to turn nuts or pull a rivet. Mounting the handle base 36 to the lid shell wall member 42 is preferred to mounting it upon the lid flange 44, since the flange 44, being remotely cantilevered from the body of the lid shell 40, is somewhat more prone to flexural bending or breakage.

FIGS. 6, 7, and 10 show that projecting through the handle base 36 are catches 39,39'. Each catch 39 is fixed to lid shell wall member 42 and extends inwardly to define a small space between catch 39 and the inside surface of lid shell wall member 42. Catch 39 is engaged by elements of latch 90 to lock the case 30 closed, in a mode hereafter described.

FIGS. 6, 7, and 10 also depict that case 30 preferably is equipped with a pair of latches 90,90' for securing the shells together to lock the case 30 in a closed position. Alternative embodiments of the apparatus of the invention may feature one, three, or even four latching mechanisms. In the preferred embodiment, latches 90,90' are spring-operated "lift-lever" type latches. The general features and operation of lift-lever type latches are known in the art; however, the latches 90,90' incorporated in the preferred embodiment of this invention are modified to operate in an innovative manner and are unconventionally attached to the case 30. As the drawings show, the latches 90,90' are attached to the base shell 80. Importantly, the latches 90,90' are mounted upon the base shell wall member 82, and preferably are not mounted upon and do not contact the base flange 84. In the preferred embodiment, the latch 90 is spaced away from the base flange 84, to provide a gap or slot space between the bottom of the latch 90 and the base flange 84.

Figure 9:
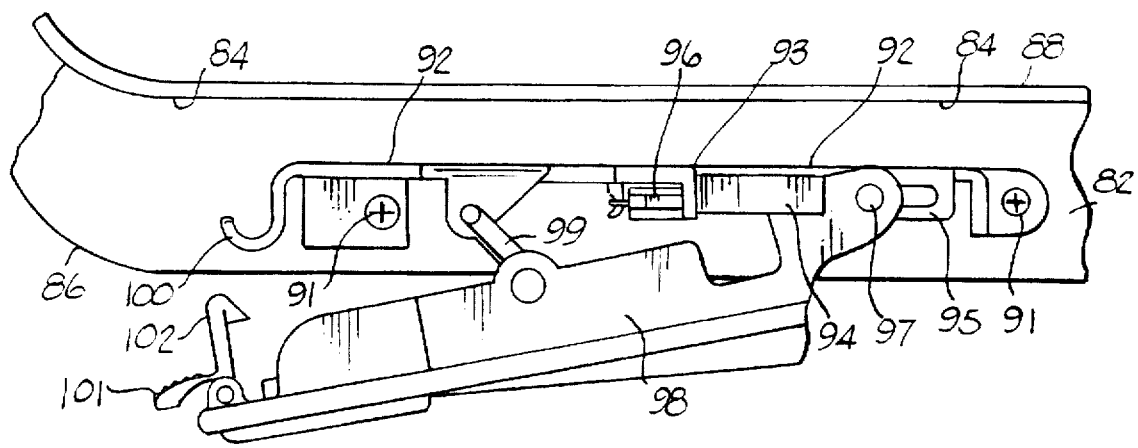
FIG. 9 is a partial enlarged view of the latch portion of the FIG. 7 embodiment.

As best shown in FIGS. 6, 9 and 10, a latch 90 is securely mounted directly to the outside face of the base shell wall member 82 using rivets 91,91' or the like. The screws or rivets 91,91' pass through the latch 90, penetrate the base shell wall member 82, and may be secured with nuts or the like. An optional latch backing plate 89 may be placed on the inside of base shell wall member 82 to provide reinforcement and a rigid surface against which to turn nuts or pull a rivet.

FIGS. 6 and 10 show how the mode of mounting the handle base 36 and the latch 90 avoids interfering with the overlapping engagement of the two flanges 44,84. Both latches 90,90' function the same and engage other elements of the case 30 in the same way, so description of one latch serves to describe both. Because latch 90 is mounted upon the base shell wall member 82 removed somewhat remotely from the base flange 84, a space is provided between the latch 90 and the base flange 84 into which the lid flange 44 may be slidably inserted. Thus, when the case 30 is completely closed, the lid flange 44 nestles against the base flange 84, with the lid shell peripheral edge 48 against the base shell wall member 82 (as seen in FIG. 5), without any interference from the latch 90. When the case 30 is closed, a portion of the lid flange 44 thus is smoothly interpositioned between the bottom of the latch 90 and a portion of the base flange 84. The invention thus permits the shells 40,80 to be latched together without projections or apertures of any sort having to penetrate either the base flange 84 or the lid flange 44.

FIGS. 2, 3, and 10 show that the case 30 closes with the handle 34 and handle base 36 disposed between the two latches 90,90'. The interior ends of the latches 90,90' substantially align with corresponding exterior ends of the handle bezels 35,35'. The handle bezels 35,35' feature a space between a portion of each bezel 35,35' and the lid flange 44, so that an abbreviated portion of each latch 90,90' fits under a portion of a corresponding bezel 35,35' when the case 30 is closed, as suggested by the detail of FIG. 10. Thus, the case 30 can close completely, with the lid flange 44 on the exterior of, and surrounding, the base flange 84, and yet with the latches 90,90' also fully accessible on the exterior of the case 30, as shown in FIG. 3.

Conventional lift lever latches known in the art typically are "bottom-mounted" in that they are attached to the luggage by means of screws or rivets passing through the latch's bottom plate and into the luggage frame. Likewise, most latch levers generally are "bottom-locking." Bottom-locking latch levers utilize a lock cylinder which passes through the bottom plate of the latch lever and through the frame of at least one shell, in order to lock the latch to the frame and thereby secure the shells together.

Latch 90 of the present invention, shown enlarged in FIGS. 9 and 10, is similar, in general operation, to lift lever latches known in the art, but is distinguishable from known devices in that it is innovatively side-mounted rather than bottom-mounted, and locks solely to its own bottom plate 92, rather than to a frame member. As previously mentioned, a side of latch 90 is attached to the wall member 82 of the base shell 80; the bottom plate 92 of the latch 90 is not used to fix the latch 90 to the shell 80. (Attachment of the latch 90 to the shell 80 more according to standard practice would involve screwing or bolting the bottom plate 92 directly to the base flange 84.)

Similarly, latch 90 is side-catching. Latch 90 has hooked bolt 94, which extends from the side of the latch 90. Hook bolt 94 is engageable with the catch 39 protruding from the handle base 36; engagement of bolt 94 with catch 39 serves (with hinges 71,71') to securely latch lid shell 40 to base shell 80 when case 30 is closed. Thus, latch 90 features a lateral catching feature.

Continued reference is made to FIGS. 9 and 10, which illustrate a configuration of latch 90. Latch 90 has a main body 93 which is securely attached to the wall member 82 of the base shell 80. Main body 93 has rail 95 upon which shuttle 96 may glide, that is, shuttle 96 is slidably attached to rail 95. Grip lever 98 is manually lifted and lowered to disengage and engage the latch 90. Grip lever 98 is pivotally connected to shuttle 96 by means of an axle pin 97. Axle pin 97, which runs through both lever 98 and shuttle 96, preferably also is disposed through slots in rail 95, so that shuttle 96 may slide horizontally (i.e. parallel to base flange 84) to and fro upon rail 95, but is constrained against up and down motion (perpendicular to base flange 84). Hook bolt 94 is rigidly or integrally attached to, and extends laterally from, shuttle 96. Grip lever 98 also is swingably connected to main body 93 by link arm 99 which is pivotally connected at its ends to lever 98 and body 93 respectively. Pivotally disposed at the distal end of lever 98 are tab 101 and claw 102. When the case 30 is closed, grip lever 98 may be depressed, causing claw 102 to interengage with cleat 100. An elastic member 104, such as a spring or the like, connects shuttle 96 to main body 93, and biases shuttle 96 toward the distal end of the main body 93, i.e., toward the cleat 100.

The figures show the components of the latch and handle assemblies as they might appear immediately prior to the shutting of the case 30, and aid in the understanding of the operation of the latch 90. Latch 90 is in an open position, with lever grip 98 lifted. When the case 30 is completely closed, the peripheral edge 48 of the lid flange 44 preferably abuts the outside face of the base shell wall member 82, and a portion of the latch 90 moves under the protruding portion of the handle bezel 35. With the case 30 closed, grip lever 98 is depressed downward; as the lever is pushed downward toward the lid flange 44, it pivots about both the axle pin 97 and the link arm 99 (while the link arm 99 also swings around its connection with main body 93). Concurrently, the shuttle 96 glides upon the rail 95, against the tension force of the elastic member 104, as the entire grip lever 98 shifts downward and slightly toward the proximal end of the body 93, i.e., toward the handle 34.

When the lever 98 has been completely depressed, it is substantially parallel with the bottom plate 92 of the main body 93 and with both the flanges 44,84 (which now overlap). Shuttle 96 is translated to its maximum position proximate to the handle bezel 35, which causes hook bolt 94 to engage catch 39. The insertion of hook bolt 94 between catch 39 and lid shell wall member 42 latches the shells 40,80 together by connecting their respective wall members 42,82. The latching is secured by the engagement of claw 102 with cleat 100. This engagement may be doubly assured with the actuation of the key lock 103 cylinder upon grip lever 98, if desired. Key lock 103, when engaged, secures the grip lever 98 to the bottom plate 92, which prevents grip the lever 98 from being lifted to disengage the hooked bolt 94 from the catch 39. The latch 90 of the invention is distinguishable from prior lift lever latches in that the grip lever 98 locks directly and only to bottom plate 92, and not the base flange 84, which allows the opposing shell flange 44 to be inserted between the latch 90 and the flange 84. When the case 30 is closed and the latch levers 98 depressed, the latches 90,90' are desirably recessed at least in part within the channel defined by the wall members 42,82 and the lid flange 44.

The shells 40,80 are unlatched by repeating the latching process in reverse progress. Tab 101 is first lifted to release claw 102 from cleat 100. A slight upward tug on the lever 98 pulls the lever 98 from its closed position, at which time the energy stored in the stretched elastic member 104 is released, causing the shuttle 96 to be quickly pulled along the rail 95 toward the distal end of the latch 90, with the result that the lever 98 rotates around axle pin 97 and link arm 99, and "pops" upward to a fully distended position, as shown in FIG. 9. The shuttle 96 is pulled to its maximum distal position (away from handle 34) by the elastic member 104, which results in a concomitant movement of the hook bolt 94, thus disengaging it from the catch 39. The user may then grip the handle 34, and lift the lid shell 40 and swing it up and away from the base shell 80 to open the case 30.

The lift lever 90, however, is substantially independent of any particular feature of either shell 40,80. It is lockable to itself (rather than to an opposing shell element) using the cleat 100 and claw 102, and engages a catch 39 which is mountable virtually anywhere upon an opposite shell. Consequently, the latch functions with a minimum of weakening penetrations through the shells.

FIGS. 2, 7, and 10 show an auxiliary system for guiding the proper alignment of the two shells 40,80 upon closure of the case 30. Protruding rigidly from the side of handle base 36 are one or more alignment pins 110,110'. Corresponding pin apertures 111,111' occur in the base shell wall member 82. Pins 110,110' align with the pin apertures 111,111', and, during closure of the case 30, pins 110,110' are inserted into apertures 111,111'. While the case 30 is closed, the engagement of pins 110,110' with apertures 111,111' helps prevent parallel relative shifting of the overlapping flanges 44,84. Pins 110,110' also assist in the transfer of shear forces between the two shells 40,80 of the case 30; when a loaded case 30 is held in an upright position, the load forces are transferred between the wall members 44,84 via the contact of the pins 110,110' with the base wall member 84.

It is seen therefore, that the mode and apparatus for latching the shells 40,80 of the invention together provides for secure closure of the case 30 without any need to penetrate the flanges 44,84 with any holes, bolts, screws, catches, or other components. This advantageous lack of any apertures through, or attachments to, the flanges 44,84 results in stronger flanges and the unobstructed overlapping of the flanges to permit a smooth, unimpeded closure of the case 30. Also, limiting attachments of both the latches 90,90' and the handle 34 to the outwardly facing surfaces of the walls 42, 82 respectively help simplify factory assembly. The shells 40,80 are conveniently held on a horizontal work surface (such as in FIG. 7), and various screw fasteners are inserted from above to attach, in a "top down" manner, the respective hardware assembly to the wall members 42,82.

Since nothing is affixed to the flanges 44,84, there is no need for complex positioning devices to hold the shells 40,80 vertically, and to rotate and/or reposition the shells, to aid in inserting fasteners through the flanges.

As shown in FIGS. 4–6, the shells 40,80 may be molded with one or more bumper strip channels 50,50' which are shallow channels or mild grooves running around the perimeter of the shell 40,80 near the rim 46 or 86. Strip channels 50,50' are optional features used to enhance the appearance of the shell. Strip channels 50,50' may receive and retain bumper strips. Bumper strips (not shown) lengths of resilient ribbon or cord wrapped around the perimeter of a luggage shell to absorb some of the ordinary wear and tear to which the luggage is subjected. The bumper strip often is colored in a hue that is complimentary or pleasantly contrasting to the color of the shell 40 or 80, and thus serves the dual purpose of improving the aesthetics of the case 30 as well as extending its life. The process of the invention also promotes the ability to mold other desirable functional and/or aesthetic features into the shells in the general vicinity of the shell rims 46,86.

Known pressure or vacuum forming devices and systems cannot manufacture the luggage apparatus as described. In present systems, the formation of the wall members 44,84 and/or the flanges 44,82 in the configurations shown (i.e. walls 42,82 projecting substantially perpendicularly inward from side portions 83a,83b) would seriously impede the removal of the molded product from the mold. The wall members 42,82 would tend to catch upon, or "hang up" on the corresponding annular shoulder portion of the mold which formed the wall members, locking the product in the mold.

Figure 11:
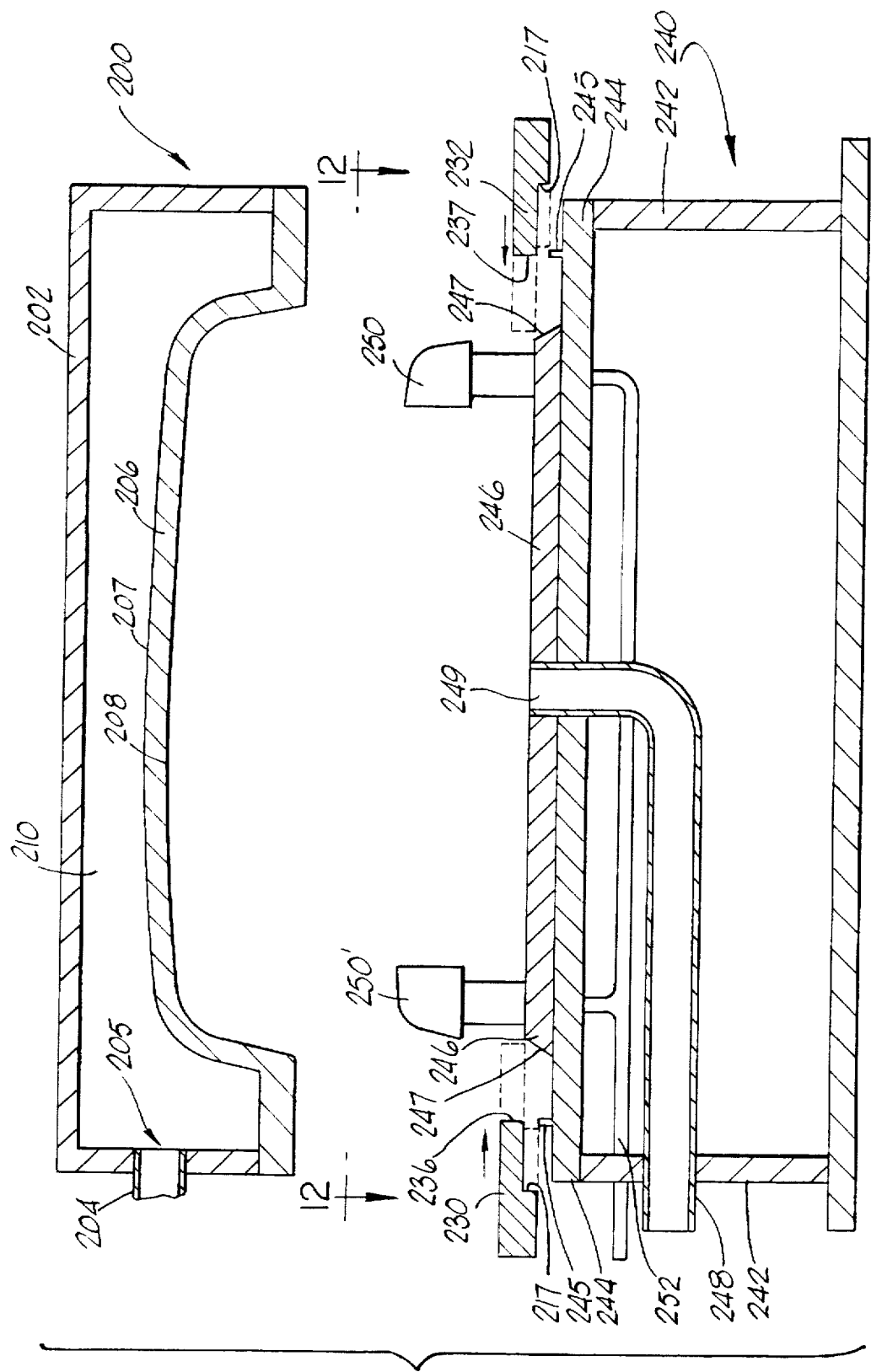
FIG. 11 is a sectional side view of the preferred embodiment of the manufacturing apparatus of the invention, showing the platen assemblies in a separated relation.
Figure 12:
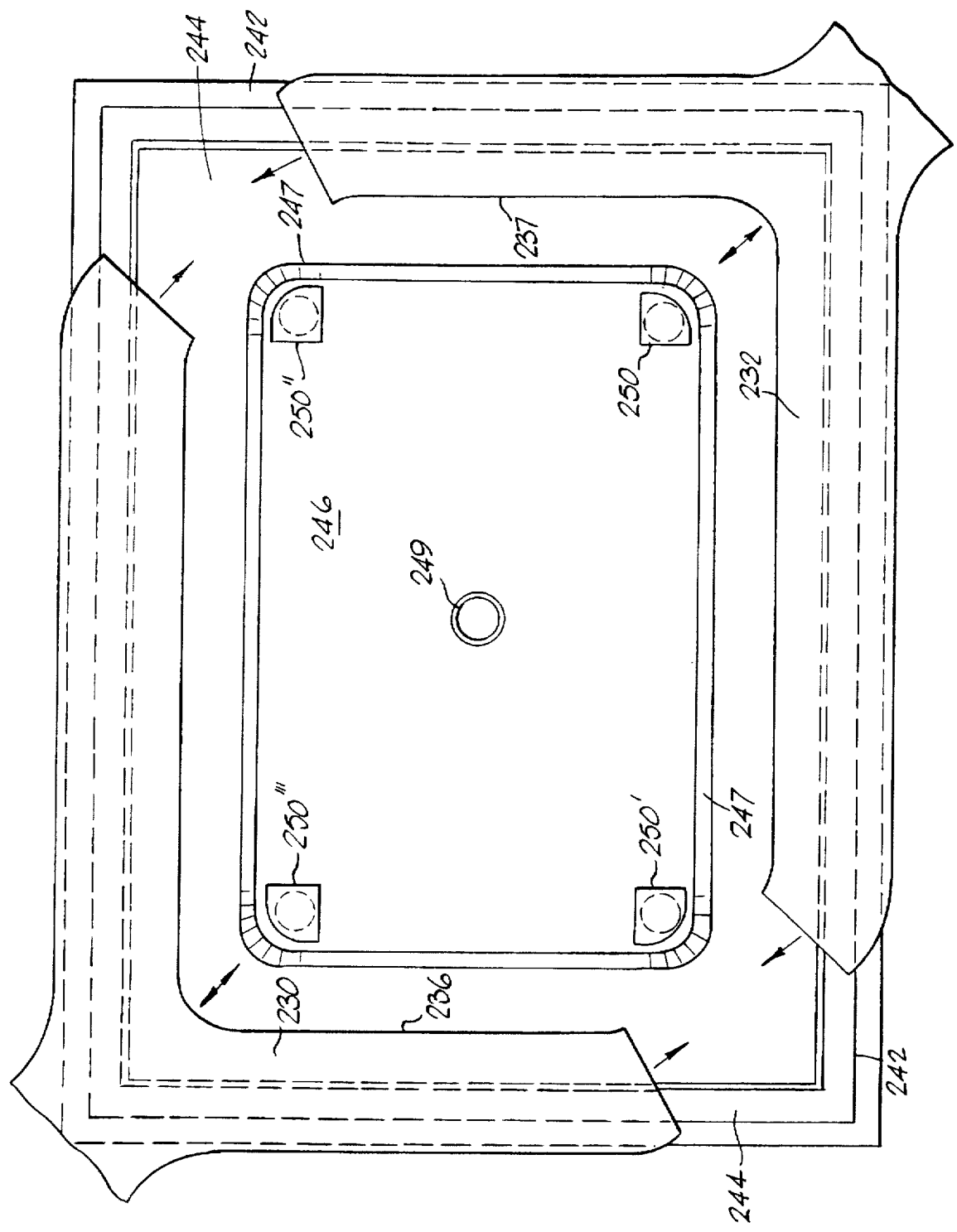
FIG. 12 is a top sectional view of a portion of the FIG. 11 embodiment, the section taken substantially along section line 12—12 in FIG. 11, showing the side draw forms in a substantially retracted position.
Figure 13:
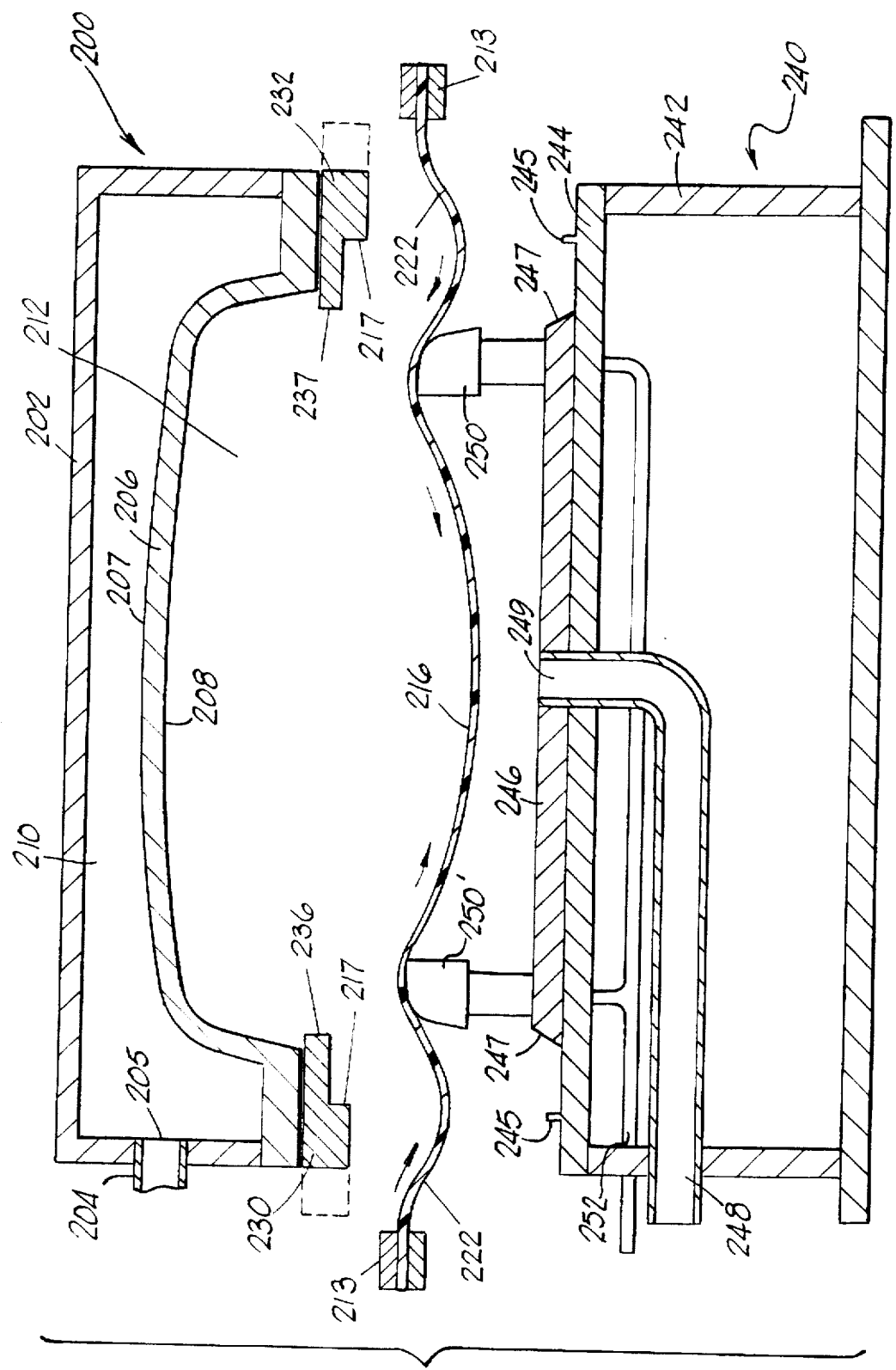
FIG. 13 is sectional side view of the embodiment of FIG. 11, showing the placement of a sheet of thermoplastic material to be molded.
Figure 14:
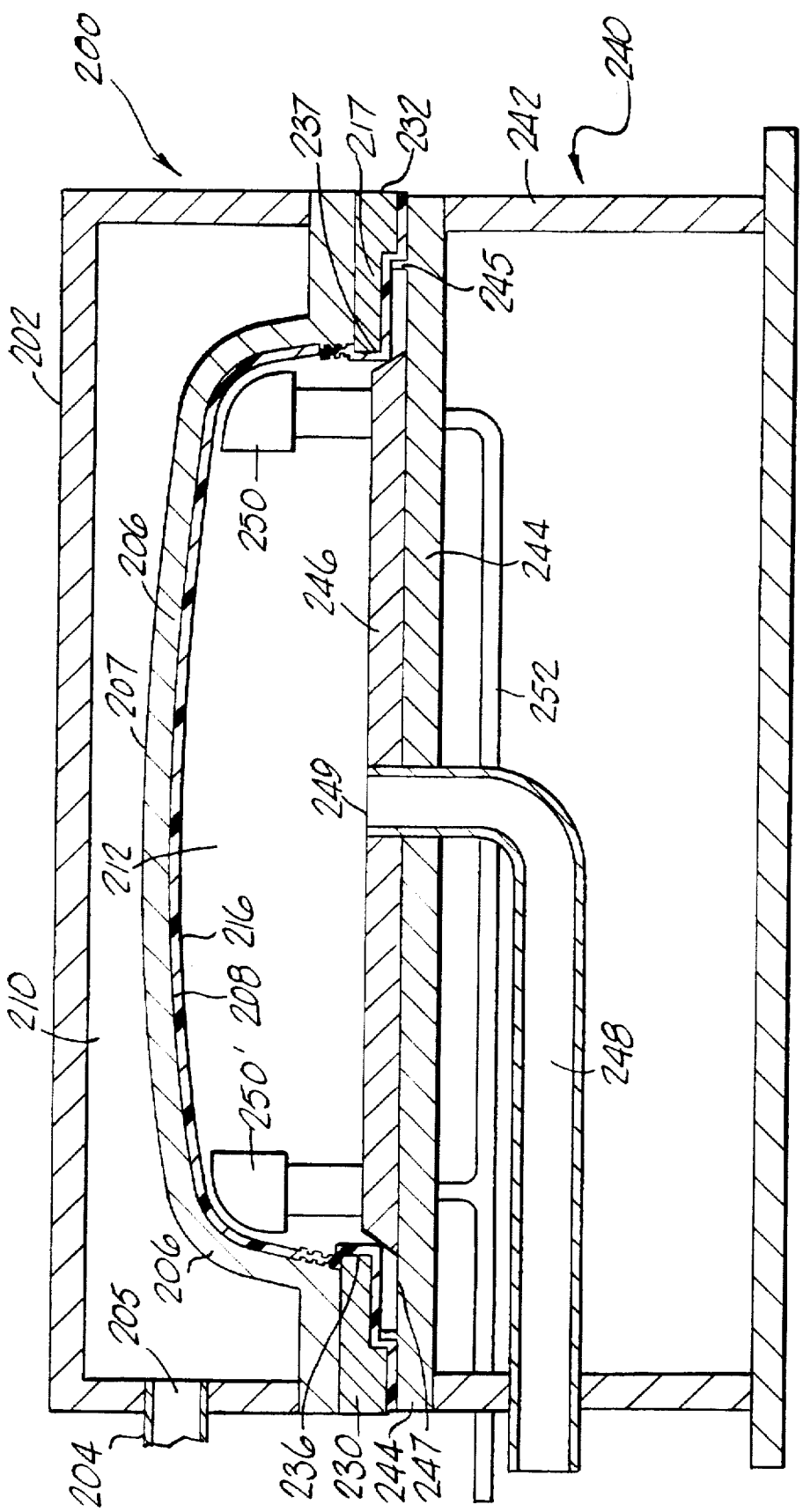
FIG. 14 is a side sectional view of the preferred embodiment, showing the side draw forms in a substantially extended position.

FIGS. 11–15 depict the principal components of the inventive apparatus for performing the process of the invention. The apparatus includes an upper platen assembly 200 and a lower platen assembly 240, positioned in parallel opposition to each other, preferably horizontally, one above the other. Hydraulic or other known systems permit upper platen assembly 200 and lower platen assembly 240 to be moved perpendicularly with respect to each other, e.g. closer or further apart. Known technologies permit the controlled adjustment of the distance between the platen assemblies 200,240, by moving either the upper platen assembly 200 or the lower platen assembly 240, or both of them. The platen assemblies 200,240 accordingly may be substantially separated, or may be brought into contact. FIGS. 11 and 13, for example, show the platen assemblies 200,240 in widely separated positions, while FIG. 14 shows the platen assemblies 200,240 drawn near together.

In the preferred embodiment, upper platen assembly 200 includes vacuum box 202 and shell mold 206. As illustrated generally in the figures, shell mold 206 has an outside surface 207 and an inside surface 208; the latter is the mold surface which serves to define the shape to which the product is molded. In the invention, the shell mold 206 is removable and interchangeable, permitting the use of the apparatus to manufacture luggage shells, or other product, in a virtually unlimited assortment of shapes, surface finishes, and surface features. The outside surface 207 of shell mold 206 functions in conjunction with vacuum box 202 to define and substantially surround the evacuation space 210. Shell mold 206 is in sealed contact with the vacuum box 202. Vacuum box 202 has one or more vacuum orifices 205 connected to a corresponding vacuum line 204. Vacuum line 204 is in fluid connection with known pump devices. Pumps (not shown) are used to evacuate the air (or other gas) from the evacuation space 210 in vacuum box 202.

The evacuation space 210 is defined by the components of the upper platen assembly 200 such that evacuation space 210 may be sealed and isolated from the ambient atmosphere. FIGS. 11, 13, and 14 show that this may be accomplished by placing shell mold 206 in sealed contact with vacuum box 202. Vacuum box 202 has a gasketed seal with the outside surface 207 of the shell mold 206. Upper platen assembly 200 and vacuum box 202 are adapted to function with an assortment of differing shell molds 206. In the embodiment depicted in FIGS. 11–15, shell mold 206 is a concave or "female" mold for shaping a luggage shell. The final shape and surface finish (smooth, faux grain leather, stippled, etc.) of a shell to be molded is determined by the mold surface 208 of the shell mold 206. Within the concavity of shell mold 206, and partially defined thereby, is form space 212.

Reference is made to FIGS. 13 and 14. Shell mold 206 is completely perforated by a plurality of vacuum apertures (not shown) more or less uniformly distributed over shell mold 206 generally in accordance with known art. The apertures permit passage of air from within form space 212 into evacuation space 210. In the course of the molding process, a heated sheet 216 of shell material is forced against the mold surface 208 by a pressure differential induced across the shell mold 206. The pressure differential usually is attributable to an elevated gas pressure within form space 212 and a reduced gas pressure within evacuation space 210. Alternatively, the form space 212 may be pressurized without a concurrent depressurization of the evacuation space 210 or, a more common alternative may be to evacuate the evacuation space 210 without affirmatively pressurizing the form space 212.

In the preferred embodiment, sheet 216 is composed of ABS plastic. Alternative embodiments may use sheets of polypropylene. Other thermoplastics may be utilized, with variable levels of success. The preferred pressure differential is between approximately 35 p.s.i and approximately 40 p.s.i., with an upper limit of approximately 125 psi. Differential pressures below 35 p.s.i. must be accompanied by the use of plastics with extremely low melt flow indexes; however, low melt flow indexes adversely affect other key material properties such as impact strength and flexural modulus.

Lower platen assembly 240 includes support box 242, which supports the seal plate 244, and at least one pinch off plate 246 located upon seal plate 244. An optional seal key 245 may protrude from seal plate 244 throughout the periphery of the seal plate 244. Seal key 245 corresponds to a seal shoulder 217 in each of side draw forms 230,232. Key 245 may contact the undersides of side draw forms 230,232 and engage shoulder 217 when upper platen assembly 200 and lower platen assembly 240 are drawn into mutual contact, as depicted in FIG. 14. With seal key 245 substantially against shoulder 217, form space 212 is sealably and substantially completely enclosed by shell mold 206, side draw forms 230,232, and seal plate 244.

At least one gas pressure line 248 supplies gas (e.g. air) to form space 212. A pump (not shown) pumps air or other suitable gas through gas pressure line 248 to elevate the fluid pressure in form space 212. Gas pressure line 248 may pass through the support box 242 and seal plate 244 en route to the injection aperture 249 at the form space 212. Depending upon the particular configuration of the pinch off plate 246, pressure line 248 may pass through it as well.

Above the pinch off plate 246 are chilled corner plugs 250,250',250",250''', which project from the seal plate 244 and occupy locations within the form space 212 when the two platen assemblies 200,240 are brought together. For operational convenience, corner plugs 250,250',250",250''' may be controllably movable up and down with respect to seal plate 244, such that they may be alternatively retracted into and extended out of the support box 242 (by passing through sealed apertures in seal plate 244 and pinch off plate 246). Chilled corner plugs 250,250',250",250''' serve to cool and shape preselected localized sections of the heated sheet 216 prior to differential pressure forming. In the embodiment illustrated, corner plugs 250,250',250",250''' are shaped to provide convex or "male" forms to preliminarily shape the corners of the shell before the final molding is accomplished by the differential pressure forming process. Chilled corner plugs 250,250',250",250''' are in fluid communication with a source of cooled fluid (not shown), which is recirculated to and through the plugs via coolant lines 252.

In the preferred embodiment, pinch off plate 246 is disposed upon and parallel to seal plate 244. The outer edge 247 of pinch off plate 246 is bevelled at an obtuse angle, such that the edge 247 of the pinch off plate 246 slopes outward away from the center of the plate 246 throughout its periphery. When, prior to the creation of a pressure differential to accomplish vacuum and/or pressure forming, the side draw forms 230,232 are moved to their maximum inward position, the oblique face of beveled edge 247 comes in close proximity to the lower edge of the inside faces 236,237 of side draw forms 230, 232. During pressure and/or vacuum forming of a luggage shell, the sheet 216 of shell material is placed between the side draw forms 230,232 and the pinch off plate 246.

Figure 14A:
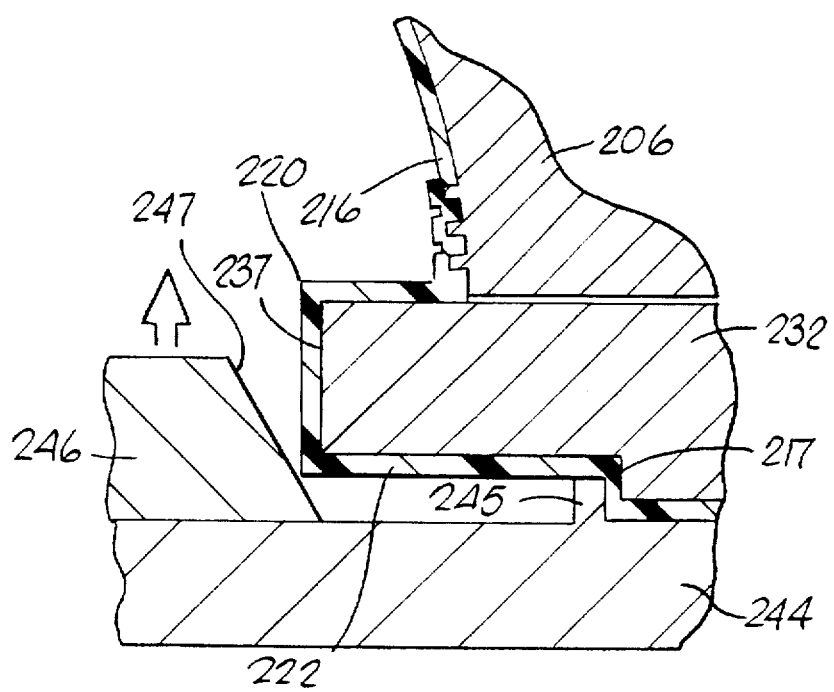
FIG. 14A is a partial enlarged sectional side view of a portion of the embodiment of FIG. 14, showing details of the pinch plate, side draw form, and seal plate elements, with the pinch off plate in a lowered position.
Figure 14B:
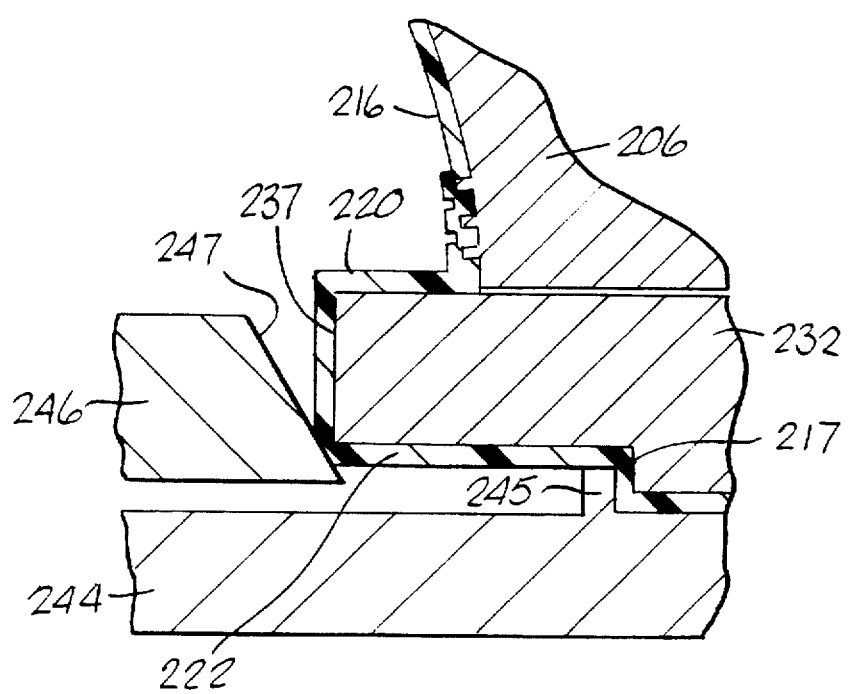
FIG. 14B is another view of the FIG. 14A embodiment, showing the pinch off plate in a raised position.

In the preferred embodiment, pinch off plate 246 is movable away from seal plate 244. Known hydraulic or other systems control movement of pinch off plate 246. As best indicated in FIGS. 14A and 14B, pinch off plate 246 may be moved up and down a relatively short distance, such that it may be in contact with seal plate 244 or spaced parallel away and above seal plate 244. Moving the pinch off plate 246 upward to contact the side draw forms 230, 232 severs or "pinches off" the selvage portion 222 of the sheet of thermoplastic 216, to leave a clean, uniform, trimmed edge along the formed shell.

Figure 15:
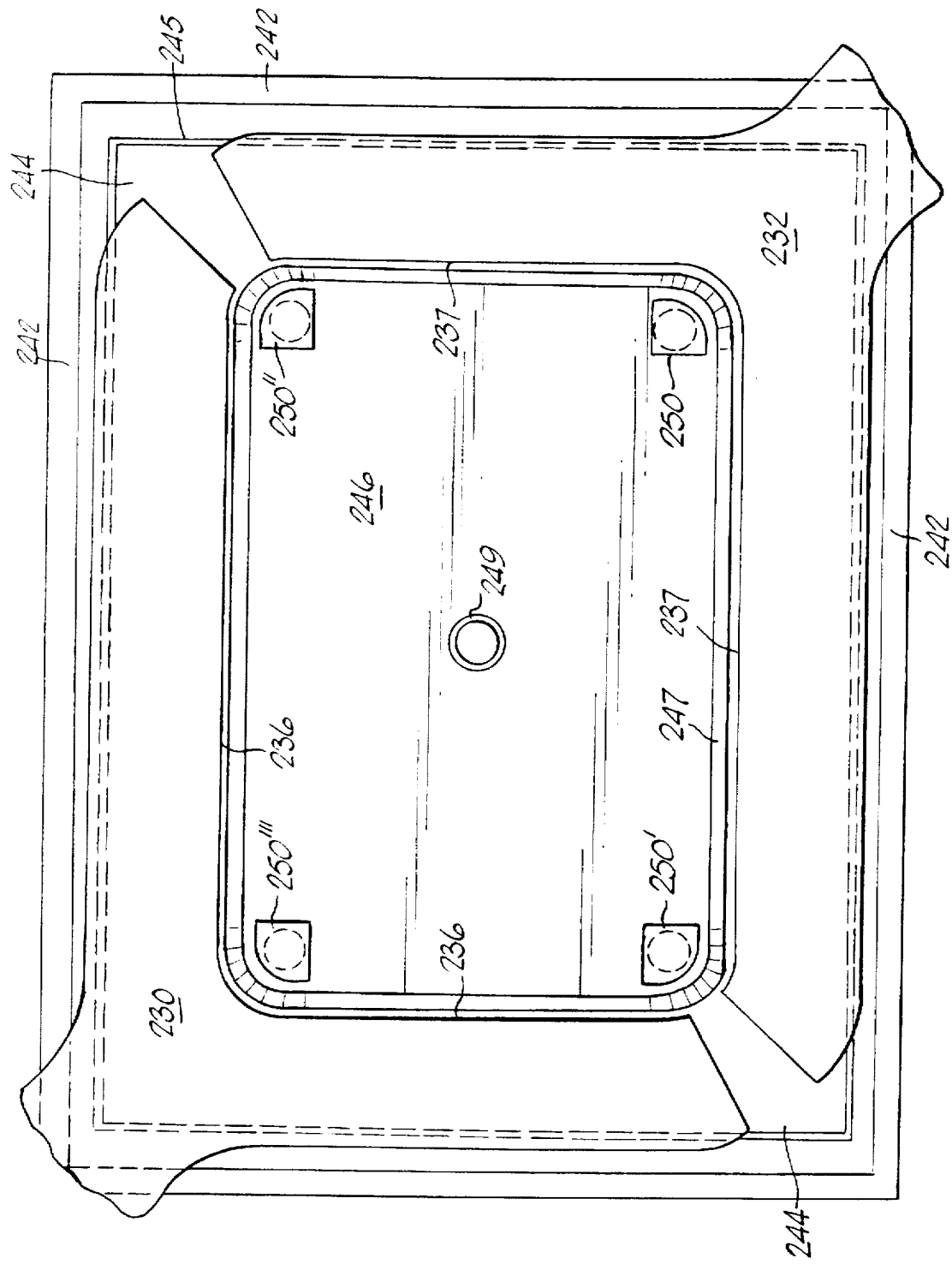
FIG. 15 is a top view of the embodiment of FIG. 12, showing the side draw forms in a substantially extended position.

Disposed below shell mold 206 and above seal plate 244 are at least one, but preferably two or four side draw forms 230,232. The practice of the invention involves the movement of the side draw forms 230,232. Side draw forms 230,232 are movable separately from either of the platen assemblies 200,240. As best illustrated in FIGS. 12 and 15, side draw forms 230,232 are laterally movable molding elements, used to shape the final product. Side draw forms 230,232 are movable, as with hydraulic, pneumatic, or mechanical jacking systems or the like, radially inward and outward from the center of the pinch off plate 246 as indicated by the directional arrows in FIG. 12. FIG. 12 shows the side draw forms 230,232 in a retracted position, withdrawn outward from the pinch off plate 246.

Controlled hydraulics are used to translate simultaneously the side draw forms 230,232 inwardly toward, or outwardly away from, pinch off plate 246, as indicated by the directional arrows and phantom lines in FIGS. 11 and 12. FIG. 15 shows the side draw forms 230,232 moved into a position much closer to pinch off plates 246. As indicated from FIGS. 13, 14, 14A and 14B, when, in the preferred embodiment, the side draw forms 230,232 are extended to the closed position, their inside faces 236,237 protrude past the inside mold surface 208 of the shell mold 206 and inwardly into the form space 212. As suggested by FIG. 11, the side draw forms may be retracted to a fully open position, and the inside faces 236,237 are pulled outwardly and past the inside mold surface 208. In their fully extended, or "closed" position, the ends of the side draw forms 230,232 actually contact one another, so that the forms 230,232 define an annulus surrounding the pinch off plate 246 and substantially circumscribing and defining the periphery of the product being molded.

The figures show an embodiment of the invention utilizing two side draw forms 230,232, each having two perpendicular legs. The motion of each side draw form 230,232 is substantially linear along a diagonal axis, as suggested in FIG. 12. The diagonal axis of translational movement for each form may generally be described as a line running through the centroid of the pinch off plate 246 and through the corner of the plate proximate to the respective form 230 or 232. As each plate 230,232 moves inward, its perpendicular legs move and mold two adjacent sides of the product being molded.

It will be apparent to a person of ordinary skill in the art that the number of side draw forms utilized in the invention is variable, and may be adapted to customize the apparatus to particular molding projects. For example, if it is desired to utilize the side draw forms to create steep-sided depressions or deep pockets (e.g. wheel wells) in the sides of a molded shell, it may be preferable to employ four independently movable side draw forms, one form for each side portion of the shell. The use of four side draw forms, while more complicated and expensive, permits each form to perpendicularly address a single respective side of the luggage, to form perpendicular depressions into the side of the shell. (In versions of the invention utilizing two side draw forms, each form obliquely addresses two sides of the shell simultaneously, limiting its ability to create features perpendicularly inward into any given side.) Still other embodiments of the invention, however, may use a single side draw form in those instances when it is not necessary to form the entire periphery of the final product, but only one or two sides.

Side draw forms 230,232 may also be independently movable up and down between the two platen assemblies 200,240. For ease of illustration, FIG. 11, for example, shows side draw forms 230,232 in a lowered position, nearly in contact with seal plate 244. FIG. 13 shows the side draw forms 230,232 raised up to make a sealed contact with the outer periphery of the shell mold 206.

The manufacturing apparatus of the invention is depicted in the drawings as having a female shell mold 206 mounted within the upper platen assembly 200, and pinch off plate 246 and seal plate 244 disposed within the lower platen assembly 240. It should be readily understood, however, that the entire apparatus may be inverted as to function or position without arresting its function or exceeding the scope of the invention. The lower platen assembly 240, for example, alternatively may include the shell mold and vacuum box defining an evacuation space, while the upper platen assembly 200 may be constituted from a seal plate disposed below a support box, with a pinch off plate hanging from the seal plate. This "upside down" embodiment may affect use of chilled corner plugs, but otherwise will meet the objectives and supply the advantages of the invention. Similarly, acceptable alternative embodiments of the invention may include the use of "male" shell molds, whereby the sheet of thermoplastic is forced against a convex mold.

The practice of the process of the invention, and some of its advantages, may now be described. Reference is made to FIGS. 11 and 12, which depict the apparatus of the invention at the very beginning of a manufacturing cycle. In FIGS. 11 and 12, upper platen assembly 200 is in a raised position to provide working room between it and lower platen assembly 240. For clarity of illustration, FIG. 11 shows a substantial separation distance between the upper platen assembly 200 and lower platen assembly 240. In practice, the platen assemblies 200,240 may actually be separated by a relatively small distance, sufficient separation merely to allow the insertion of a sheet of thermoplastic material (FIG. 13) therebetween.

Contact between vacuum box 202 and the outer surface 207 of shell mold 206 is sealed against air leaks. The contact between seal plate 244 and support box 242 is likewise sealed. The selected side draw forms 230,232 are installed in the retracted position (FIGS. 11, 12 and phantom lines in FIG. 13), but are then moved into the extended position (FIG. 14 and phantom lines in FIG. 11). FIG. 15 shows forms 230,232 in a position just short of full inward extension; at complete inward extension, the corresponding distal ends of the legs of the forms 230,232 actually come in contact to complete a ring around the formed sheet 216. Cooled water or other fluid is pumped through the coolant lines 252 to the corner plugs 250,250',250",250'", and constantly recirculated, to aid in withdrawing heat from the heated and flaccid thermoplastic sheet 216 where the plugs contact the sheet. Chilled corner plugs 250,250',250",250'" are in position above the pinch off plate 246 as shown in FIG. 11 or, alternatively, may be posed below the pinch off plate 246 but ready to be moved upward into the position shown in FIG. 11.

A sheet 216 of thermoplastic material is heated to render it plastic and malleable. The sheet 216 is gripped around its edges and maneuvered (up and down and to and fro) with control clamps 213,213', as depicted in FIG. 13. Control clamps 213 serve to fix and maintain the length of the outside edge of the sheet 216. Also as depicted in FIG. 13, the two platen assemblies 200,240 are separated and the side draw forms 230,232 positioned to allow the hot, pliable, sheet 216 of thermoplastic material to be moved into a position between platen assemblies 200,240. The sheet 216 is placed centrally above the pinch off plate 246, above the chilled corner plugs 250,250',250",250'", and below the shell mold 206 and the side draw forms 230,232.

After the heated sheet 216 is moved into position, it is brought into contact with the surfaces of the chilled corner plugs 250,250',250",250'", by lowering the sheet 216, by raising the plugs, or by raising the entire lower platen assembly 240. At this point, the plugs 250,250',250",250'", function to partially support the sheet 216. As seen in FIG. 13, the sheet 216, flaccid at elevated temperature, is supported where it contacts the chilled corner plugs 250,250', 250",250'" and is unsupported elsewhere. The sheet 216 may be essentially planar when first placed between the platens 200,240, but its elevated temperature renders it moldable. Due to the effect of gravity, the central portion 219 of the sheet, unsupported between the plugs 250,250',250",250'" may droop or sag downward, tending to assume, in cross sections taken between plugs, the shape of a hanging catenary. Importantly, as the central portion 219 of the sheet 216 droops downward, it also tends to pull upon the selvage portion 222 of the sheet on the outside of the plugs 250, 250',250",250'", thus stretching the sheet up and over the plugs toward the center of the pinch off plate 246, as indicated by the directional arrows in FIG. 13. In this manner, thermoplastic material is moved from portions of the sheet 216 that would otherwise become offal to the portions of the sheet to be formed into the final product.

A drawback of many typical vacuum or pressure formed items is weakness in outside corners; luggage shell corners common to the current art often crush or collapse under impact loading. This weakness is due at least in part to the fact that conventional vacuum or pressure forming processes reduce the amount of shell material in the corner portions of the shell. Forcing the flaccid sheet of thermoplastic completely into the extreme corners of the shell mold tends to stretch the sheet in the vicinity of corners, with the result that the sheet is there thinner and thus weaker. Less stretching of the sheet is required to push the main portion of the sheet against the generally planar portion of the mold to form the panel portion of the shell. As a result, conventional differential pressure formed luggage shells frequently are thinnest at the corners and thickest in the main panel.

This is opposite of the optimum condition, since the corners of the shell are subject to the highest stresses and thus ideally should be the thickest and strongest part of the shell.

Another disadvantage inherent with existing pressure differential molding methods is that all portions of the sheet of material must be stretched, to greater or lesser degrees, to force the sheet into the shell. Because the formed shell in three dimensions has a greater total surface area than the original surface area of the planar piece of sheet used to form the shell, and because a fixed volume of thermoplastic material is available to be forced into the mold during a given manufacturing cycle, a net reduction in the average thickness of the sheet must accompany the forcing of the sheet against the mold.

Advantages of the invention are thus here manifest. It is known in the art of differential pressure forming to provide plug assists to help shape a flaccid sheet of thermoplastic immediately prior to applying the pressure differential to mold the product. In the present invention, the corner plugs 250,250',250",250'" are shaped and selectively located to help pre-form only the portions of the sheet 216 that will form the corners of the shell, and are actively cooled. The chilled corner plugs 250,250',250",250'" not only help shape the sheet 216, but also reduce stretching of the parts of the sheet 216 corresponding to the shell corners. As the hot, flaccid, sheet 216 is moved to the chilled corner plugs 250,250',250",250'", the portions of the sheet 216 actually contacting the plugs are cooled substantially, reducing their plasticity. The reduced plasticity inhibits undesirable stretching in those specific parts of the sheet 216. When the sheet 216 is formed into a shell, the cooled portions undergo less stretching than in the prior art, and thus retain substantial thickness compared to the rest of the shell. In the present invention, the portions of the sheet 216 forming the corners of the luggage shell are cooled by the plugs to provide thicker, stronger shell corners.

FIG. 13 also shows that in the present invention much of the plastic sheet 216, specifically those portions between the chilled corner plugs 250,250',250",250'", may briefly be allowed to droop immediately prior to the imposition of the pressure differential used to form a shell. This drooping in the sheet 216 mildly pre-stretches all the sections of the sheet 216 except the corner portions. Thus, the invention effectively pre-stretches the central section 219 of the sheet 216 that will be formed into the bottom 81 or panel portion of the shell, where the finished shell may acceptably be thinner. One advantage of the invention is, therefore, that the hot flaccid sheet 216 prior to actual vacuum or pressure forming is cooled in those portions that form the shell corners, and is pre-stretched in those sections that form the shell panel, resulting in a vacuum-formed shell with stronger corners, but a slightly thinner panel.

Another advantage of the invention is that it increases the net volume of thermoplastic material available for molding into the final product. This increase is due to enhanced efficiency of materials use, without a net increase in actual materials requirements.

Some shell material droops downward and outward from the corner plugs 250,250',250",250'", and eventually is sandwiched between the shell mold 206 and the seal plate 244. Before the shell material is clamped between the undersides of the shell molds 230,232 and the seal plate 244, however, the sheet 216 is allowed to sag between the corner plugs 250,250',250",250'", as previously described. As a result of this sagging, the selvage portion 222 of the sheet is stretched, since the edges of the sheet 216 are fixedly held by control clamps 213,213. This stretching is manifested by some sliding of the sheet 216 inwardly over the tops of the plugs 250,250',250",250'", as shown by the directional arrows of FIG. 13. This sliding and stretching results in a movement of a net volume of thermoplastic material radially inwardly into the marginal portion from the selvage portion 222 of the sheet 216. Material also moves up and over the corner plugs 250,250',250",250'", sliding past them into and toward the central portion 219. A net increase is realized in the volume of thermoplastic material in the portion of the sheet 216 in a confronting relation with the mold 206; the beneficial consequence of this movement of thermoplastic material is that more material is available, from a given sheet 216, to be forced against the mold 206. A comparatively reduced volume of material remains in the selvage portion 222 of the sheet.

With the increase in material volume available for molding against the mold 206, the undesirable stretching of the sheet 216 to fit the mold surface 208 (especially the corners) is mitigated. More available material volume results in a thicker molded shell wall, producing a comparatively stronger shell. The finished shell product accordingly has increased performance without an increase in materials requirements.

Reference is made to FIG. 13. Once the sheet 216 has been pre-stretched to optimum conditions according to the foregoing disclosure, and shortly after the time the sheet 216 contacts the corner plugs, the seal plate 244 and side draw molds 230,232 are moved together (perhaps by moving one or both platen assemblies 200,240) to clamp the offal or selvage portion 222 of the sheet 216 between the seal key 245 and the underside of the side draw forms 230,232. The clamping together of the seal plate 244 and the side draw forms 230,232 provides an annular seal around the form space 212, with the selvage 222 acting as a provisional gasket. (The side draw forms 230, 232 may be sealed to the seal plate 244 using other methods, but the overall object is to sealably and substantially completely enclose the form space 212.) In the preferred embodiment, the form space 212 at this point in the process is entirely surrounded by the shell mold 206, the seal plate 244, and the side draw forms 230,232. The platen assemblies 200,240 may be releasably locked together to assure properly sealed enclosure of the form space 212.

Pressurization of form space 212 and evacuation of the evacuation space 210 are then initiated. Air or inert gas is pumped rapidly through the air pressure line 248 and into form chamber 212, while concurrently air is pumped out of evacuation space 210 through vacuum line 204. The result is a sudden reduction of pressure in the evacuation chamber 210 and an elevation of pressure in the form chamber 212. These pressure changes induce a pressure differential across shell mold 206, and gas is thereby caused to flow from the form space 212 to the evacuation space 210 via the vacuum apertures in the shell mold 206. Substantially in accordance with known principles of the art, the pressure differential across the shell mold 206 and the forced passage of air through the holes penetrating the shell mold 206 give rise to a corresponding fluid pressure differential across the sheet 216 itself. The pressure differential is due to a lower pressure between the sheet 216 and the shell mold 206 than the pressure between the sheet 216 and the seal plate 244. The pressure differential rapidly forces the flaccid sheet 216 firmly against the inside surface 208 of the shell mold 206, as depicted in FIG. 14. The use of the pressure differential to press the sheet 216 against the shell mold 206 is the "differential pressure forming" step of the process. The pressure differential is maintained for a period of time to insure that the sheet 216 is thoroughly impressed with every feature of the inside mold surface 208.

The imposition of the pressure differential and the pressing of the sheet 216 against the shell mold 206 is initiated while the side draw forms 230,232 are in an extended position, closed toward the pinch plate 246, and constituting a side mold completely around the periphery of the form space 212, as illustrated in FIGS. 13 and 14.

FIG. 14 shows that the elevated pressure in form space 212 forces a margin of sheet 216 against the inside faces 236,237 of the side draw forms 230,232. The inside faces 236,237 of the side draw forms 230,232 may be shaped or textured so as to mold the marginal portion of sheet 216 pressed against them. The inside faces 236,237 preferably are removably attachable to the interior ends of their respective draw forms 230,232, and may be plates or blocks that bolt onto or slip onto (e.g. key-and-slot interlock) the forms 230,232. Because inside faces 236,237 preferably are removable, they are interchangeable independently from the side draw forms 230,232 and from the main shell mold 206.

The invention thus makes it possible to vary the appearance, shape, or even the size (i.e. depth) of the molded shell without changing the entire shell mold 206. The side draw forms 230,232 also are interchangeable with respect to the shell mold 206, but the preferred embodiment allows the user to customize or adapt his product by merely switching the inside faces 236,237. Particular individual inside faces 230,232 may be configured to mold bumper strip channels, and/or locational indicia for hardware attachment, and/or aesthetic lines, logos, ridges, and/or the like into the final product shell. Likewise, the inside faces 230,232 may be configured to mold into the final shell a desired structural feature, for example a wheel well and/or a handle recess.

Similarly, the assorted sets of inside faces 230, 232 useable with a particular corresponding side draw form 230,232 and a given shell mold 206 may be of differing dimensions. By interchanging a narrower (i.e. shorter) or a wider inside face component, the overall depth of the molded container or shell may be varied from cycle to cycle without the need to exchange and replace the shell mold 206 or the side draw forms 230,232. An advantage of the invention therefore is that the independent interchangeability of the inside faces 236,237 permits many permutations in the appearance and/or structure of the finished shell using a comparatively limited number of different shell molds 206 and side draw forms 230,232.

FIGS. 14A is an enlarged sectional view depicting in detail the molding of the margin 220 of sheet 216 by a side draw form 232. Side draw form 232 extends inward, preferably past the inside surface 208 of shell mold 206 and correspondingly molds a marginal portion 220 of the sheet 216. The margin 220 may be shaped by the side draw form 232 to create a wall member element 42 and a flange 44, as those elements are similarly depicted (labelled 42 or 82 and 44 or 84, respectively) in FIGS. 4 and 5. The main or central portion of the sheet material 216 shown in FIG. 14A constitutes the bulk of the shell 40 or 80 as shown in FIGS. 4 and 5. Side draw forms 230,232, therefore, mold the shell 40,80 of the luggage case of the preferred embodiment to provide the frame feature defined by the wall members 42,82 and flanges 44,84 as described in FIGS. 1-8 and hereinabove, as well as other shell features, such as bumper strip channels and the like.

Thus, side draw forms 230, 232 mold the margins of the sheet 216 which eventually comprise the peripheral frame portion of the finished shell (and may be configured to shape the side or other portions of the shell as well). When the hot sheet 216 is pressed against the inside of the shell mold 206, it simultaneously is forced against the side draw forms 230,232 which project inward into the form space 212. The portion of the sheet 216 disposed between the forms 230,232 and the pinch off plate 246 is transformed from a planar sheet to a shape having the cross section shown in FIGS. 14 and 14A. FIGS. 4 and 8 considered together with FIG. 14 illustrate how the use of the side draw forms 230,232 molds the margins of the sheet 216 to form the flanges 44,84 and wall members 42,82 of the finished shell 40, 80. FIG. 14A also provides detail of seal key 217 crimping the offal or selvage portion 222 of the sheet 216 against shoulder 217 in draw form 232.

After the side draw plates 230,232 have been moved into the extended position shown in FIGS. 14 and 14A to form the margin 220 of the sheet 216, the sheet 216 is maintained in the configuration of FIG. 14 for a brief period longer. An optional feature of the invention may then be engaged to trim the selvage 222 from the margin 220 of the sheet 216. Presently in the art, excess shell material is cut off from the molded shell using a bandsaw or the like in a separate process step after the completion of differential pressure forming. FIGS. 14, 14A, and 14B in combination illustrate how pinch off plate 246 may be used to sever the sheet 216. FIGS. 14A and 14B are enlarged sectional views of that part of FIG. 14 showing that side draw form 232 forms margin 220 of sheet 216 inwardly past shell form 206 to close proximity to, or even mild contact with, the pinch off plate 246. Pinch off plate 246 is movable, e.g. hydraulically, in a direction perpendicular to the seal plate 244, as indicated by the directional arrow in FIG. 14A. Pinch off plate 246 normally is in parallel position and contact with the underlying seal plate 244, upon which pinch off plate 246 rests. A powered mechanism (not shown), perhaps disposed below the seal plate 244 and within the support box 242, extends through the seal plate 244 to the pinch off plate 246.

After the differential pressure forming of the sheet 216 against the shell mold 206 and the side draw forms 230, 232 has been completed (FIG. 14A), the pinch off plate 246 is moved a small distance upward and away from the seal plate 244 to the position illustrated in FIG. 14B. Movement of the pinch off plate 266 preferably occurs immediately prior to the vented release of pressure from within the form space 212 and the termination of the pressure differential across the shell mold 206. In this manner, the pressure differential holds the sheet 216 in place during the pinching-off process. FIG. 14B shows that the movement of the pinch off plate 246 pinches the sheet 216 between the oblique face 247 of the plate 246 and a lower edge of draw form 232. Pinch off plate 246 may be brought into contact with form 232, in which instance sheet 216 may be completely cut between the two contacting components 232,246. The side draw form 232 thus serves as a type of immobile cutting block against which the pinch off plate 246 may act. Pinch off plate 246 thus severs the selvage 222 (i.e. the part of the sheet 216 below the draw form 232) from the margin of the sheet 216 (the portion of the sheet 216 above the oblique face 247 of the pinch off plate 246 and interior to the shell mold 206). Alternatively, the face 247 of the plate 246 may be moved proximate to the edge of the form 232, but not in contact therewith, as shown in FIG. 14B, to constrict the sheet 216 without totally severing it. In this manner, the sheet 216 is permanently creased to facilitate later separation of the offal from the shell. The pinching of the sheet 216, either to completely sever or to crease it, provides for a clean, uniform cut of the sheet 216 between margin 220 and selvage 222. Such a cut should be uniform, since it occurs along what eventually constitutes the peripheral edge 48 or 88 of the shell 40 or 80 as shown in FIGS. 1, 2 and 4.

An advantage of the invention is that the peripheral edges 48,88 are exposed, not covered by an expensive, cumbersome metal frame, but rather are exposed, providing economy, aesthetics and easy case closure. The peripheral edges 48,88 preferably are milled or machined to a pleasant smoothness, perhaps using a computer-guided edging tool.

After the pinch off plate 246 has been moved, if desired, to pinch the sheet 216 (FIG. 14B), the sheet 216 is held against the shell mold 206 just long enough to allow it to cool and harden. Once shell sheet 216 has cooled, it loses its plasticity and becomes rigid in the general shape and form of the final product.

As mentioned, the side draw pulls 230,232 are movable radially outward from the extended positions shown in FIGS. 13, 15, and 14 and in phantom lines in FIG. 11 to the retracted position shown in FIGS. 11 and 12 and in phantom lines in FIG. 13. While the imposed pressure differential holds sheet 216 firmly against shell mold 206 and the inside faces 236, 237 as shown in FIG. 14, the side draw pulls 230,232 are actuated and controllably moved, substantially parallel to and between the platen assemblies 200,240, outward from the position depicted in FIGS. 13 and 14. The side draw forms 230,232 are pulled away from the cooled sheet 216 and retracted outward to the position shown in phantom lines in FIG. 13, and in FIGS. 11 and 12. The platen assemblies 200,240 are then moved apart to permit sheet 216, now a molded shell, to be removed from the molding apparatus for further finishing as needed, attachment of hardware and linings, and the like.

It is observed that the movable side draw forms 230,232 permit the formation into the shell of substantial shell wall members 42,82, which depend inwardly from the shell itself at angles of about ninety degrees, and yet also permit the molded shell easily to be removed from the shell mold 206. The movable character of the side draw forms 230,232 overcomes the disadvantage of the known art, in which the pressure differential forming of such substantial projections would effectively prevent the molded shell from being removed from the shell mold 206. Were the side draw forms 230,232 not radially outwardly movable, the annular wall member 82 of a formed shell 80 would be locked against the top of the immobile side draw form against which the wall member 82 was pressed, and the entire shell would effectively be permanently molded within its own mold. Conversely, without the ability to mold a significant, substantially perpendicularly projecting wall member 82, depending either inwardly or outwardly from the main or central portion of the shell, an effective increase in the moment of inertia of the shell, and thus the molding of an integrally formed frame element, would effectively be precluded using differential pressure molding. The present invention overcomes the shortcomings of known systems by permitting the molding of integrally formed container frames consisting of substantial projecting wall 82 and flange 84 elements, while also permitting the retraction of the mold components 230,232 used to shape the integral frame to allow the separation of the molded container from the mold 206.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of the patents cited hereinabove are hereby incorporated by reference.

We claim:

1. A process for molding a shell from a sheet of plastic material, the shell having a bottom and side portions extending from the bottom to a peripheral edge, the intersection of two side portions and the bottom generally defining a shell corner, the process comprising the steps of:

(a) heating the sheet of plastic material, the sheet having a central portion, a marginal portion, and a selvage portion;

(b) providing a mold means having a mold surface of a shape corresponding to the shell;

(c) providing a form space defined in part by the mold surface;

(d) providing at least one movable side draw form extending into the form space;

(e) positioning the central portion of the sheet in the mold means opposite the mold surface;

(f) providing a clamp remote from the mold surface;

(g) clamping the selvage portion of the sheet;

(h) disposing four rigid, upwardly extending, corner plugs within the form space;

(i) contacting the sheet with the four corner plugs and deliberately allowing the sheet to droop and sag by gravity between all four plugs to pre-stretch the central portion of the sheet;

(j) allowing the heated sheet to slide inwardly over the four corner plugs and into the form space prior to forcing the central portion against the mold surface;

(k) conforming the central portion of the sheet to the mold surface to form the bottom and the side portions of the shell;

(l) forcing the marginal portion of the sheet against the side draw form, thereby shaping the marginal portion to fashion a frame integrally formed with the central portion, said frame extending substantially continuously along at least one of the side portions of the shell, and said frame comprising a wall member and a flange, said forcing step comprising:

bending the marginal portion to form the wall member extending into the form space from the side portion of the shell; and fashioning the flange so that said flange extends from the wall member to the selvage portion and is disposed at an angle with respect to the wall member and to the selvage portion;

(m) laterally retracting the side draw form to a retracted position substantially outside the form space;

(n) only after laterally retracting the side draw form, removing the shell from the mold surface; and (o) severing the selvage portion of the sheet from the flange to free an edge of the flange whereby, after the step of severing, the peripheral edge is defined by the free edge of the flange.

2. The process of claim 1 wherein the step of heating the sheet of plastic material comprises heating a sheet of acrylonitrile-butadiene-styrene.

3. The process of claim 1 wherein the step of heating the sheet of plastic material comprises heating a sheet of polypropylene resin.

4. The process of claim 1 wherein the step of providing a mold means comprises providing a means for vacuum forming the sheet of plastic material against the mold surface.

5. The process of claim 1 wherein the step of conforming the the central portion of the sheet to the mold surface comprises supplying a pressure differential across the sheet to force the sheet against the mold surface.

6. The process of claim 5 wherein the step of supplying the pressure differential comprises:

(a) inducing a vacuum on one side of the sheet; and (b) applying air pressure to the other side of the sheet.

7. The process of claim 5 wherein the step of supplying a pressure differential comprises providing a upper platen assembly movably disposed parallel and next to a lower platen assembly.

8. The process of claim 7 further comprising:

(a) stretching parts of the sheet prior to supplying the pressure differential; and (b) retarding stretching of selected sections of the sheet which form the shell corners.

9. The process of claim 8 wherein the step of retarding stretching of sections of the sheet further comprises:

(a) disposing at least one corner plug between the upper platen assembly and the lower platen assembly plug to help shape at least one shell corner;

(b) cooling the corner plug; and (c) placing the heated sheet in contact with the corner plug.

10. The process of claim 1 wherein the shell is a shell of a luggage case, and wherein the frame defines a hinged opening of the luggage case.

11. The process of claim 1 wherein the shell is a shell of a luggage case, and wherein the frame defines a hinged opening of the luggage case.

12. The process of claim 1 wherein the step of severing the selvage portion of the sheet is performed while the central portion of the sheet is conformed to the mold surface.

13. The process of claim 12 wherein the step of severing a selvage portion comprises:

(a) providing a movable plate proximate to the sheet;

(b) moving the plate toward a fixed block;

(c) pinching the sheet between the block and the movable plate; and (d) separating the sheet from the mold surface after the sheet has been pinched.

14. A process for molding a luggage shell from a sheet of thermoplastic material, the luggage shell having a bottom, corner portions, and side portions extending from the bottom to a peripheral edge, comprising the steps of:

(a) heating a sheet of thermoplastic material, the sheet having a marginal portion at least partially surrounding a central portion and a selvage portion at least partially surrounding the marginal portion;

(b) partially surrounding a form space with a mold surface;

(c) placing at least one movable side draw form in an extended position protruding at least partially into the form space;

(d) providing a clamp remote from the mold surface;

(e) clamping the selvage portion of the sheet;

(f) disposing four rigid upwardly extending corner plugs in the form space;

(g) contacting the sheet with the four corner plugs and deliberately allowing the sheet to droop and sag by gravity between all four plugs to pre-stretch the central portion of the sheet;

(h) allowing the heated sheet to slide inwardly over the four corner plugs prior to forcing the central portion against the mold surface;

(i) forcing the central portion of the heated sheet against the mold surface;

(j) forcing the marginal portion of the heated sheet against the side draw form, while the side draw form is in the extended position, thereby shaping the marginal portion to define a frame, said frame comprising a wall member and a flange, along the peripheral edge, said step of forcing comprising:

bending the marginal portion to form the wall member extending at an angle from the side portions into the form space; and fashioning said flange extending from the wall members and disposed at an angle with respect to the bottom; and (k) translating parallel to the wall member the side draw form to a retracted position substantially outside the form space while the central portion is against the mold surface.

15. The process of claim 14 further comprising the steps of:

(a) severing the selvage portion of the sheet from the marginal portion; and (b) separating the central portion of the sheet from the shell mold after severing the selvage portion.

16. The process of claim 15 wherein the step of severing the selvage portion further comprises:

(a) disposing a block means on one side of the sheet;

(b) providing a movable plate means on the other side of the sheet;

(c) moving the plate means toward the block means; and (d) pinching the sheet between the plate means and the block means.

17. The process of claim 14 further comprising the step of substantially impeding the thinning of selected sections of the sheet corresponding to the corner portions of the shell.

18. The process of claim 17 wherein the step of substantially impeding the thinning of selected sections of the sheet comprises cooling the sections of the sheet prior to forcing the central portion of the heated sheet against the mold surface.

19. The process of claim 18 wherein the step of cooling the sections of the sheet comprises chilling said corner plugs.

* * * * *